United States Patent
Son et al.

(10) Patent No.: US 7,457,278 B2
(45) Date of Patent: Nov. 25, 2008

(54) TERMINAL CONNECTION DEVICE, CONNECTION CONTROL DEVICE, AND MULTI-FUNCTION TELEPHONE TERMINAL

(75) Inventors: Masayoshi Son, Tokyo (JP); Mitsuo Kurobe, Tokyo (JP)

(73) Assignee: Softbank Corp., Tokyo (JP)

( * ) Notice: Subject to any disclaimer, the term of this patent is extended or adjusted under 35 U.S.C. 154(b) by 270 days.

(21) Appl. No.: 10/514,248

(22) PCT Filed: May 30, 2003

(86) PCT No.: PCT/JP03/06855

§ 371 (c)(1),
(2), (4) Date: Jul. 8, 2005

(87) PCT Pub. No.: WO03/103259

PCT Pub. Date: Dec. 11, 2003

(65) Prior Publication Data

US 2006/0013195 A1   Jan. 19, 2006

(30) Foreign Application Priority Data

May 31, 2002   (JP)   ............................. 2002-160537

(51) Int. Cl.
*H04L 12/22*   (2006.01)

(52) U.S. Cl. .................. 370/351; 370/352; 370/355; 455/445

(58) Field of Classification Search .............. 370/235, 370/352–356, 389; 379/93.07, 93.09
See application file for complete search history.

(56) References Cited

U.S. PATENT DOCUMENTS 6,426,942 B1 * 7/2002 Sienel et al. ............... 370/235
6,870,827 B1 * 3/2005 Voit et al. .................. 370/352
6,914,897 B1 * 7/2005 Schuster et al. ............ 370/352
6,914,900 B1 * 7/2005 Komatsu et al. ........... 370/356
6,959,072 B1 * 10/2005 Lee ............................ 379/76
7,197,029 B1 * 3/2007 Osterhout et al. .......... 370/353
2003/0091024 A1 * 5/2003 Stumer ...................... 370/352
2004/0131165 A1 * 7/2004 Ebisawa et al. .......... 379/93.07
2006/0002381 A1 * 1/2006 Socaciu ..................... 370/352

FOREIGN PATENT DOCUMENTS

| EP | 1235416 | 8/2002 |
|---|---|---|
| JP | 2-148953 | 6/1990 |
| JP | 11-046260 | 2/1999 |
| JP | 2000-261553 | 9/2000 |
| JP | 2002-051145 | 2/2002 |
| JP | 2002-101198 | 4/2002 |
| WO | WO 0072536 | 11/2000 |
| WO | WO 0235816 | 5/2002 |

* cited by examiner

*Primary Examiner*—Simon D Nguyen
(74) *Attorney, Agent, or Firm*—Oblon, Spivak, McClelland, Maier & Neustadt, P.C.

(57) ABSTRACT

The VoIP gateway in accordance with the present invention serves to send a connection request to either the IP network or the PSTN on the basis of the information stored in the VOIP gateway and the destination telephone number contained in the connection request as sent from the telephone terminal. Also, even if a connection request is decided to be sent to the IP network, the VOIP gateway sends the connection request to the PSTN when the IP network state judgment unit judges that the communication through the IP network is impossible. Furthermore, if a destination telephone number includes predetermined identification information, the VOIP gateway can forcibly send the connection request to the PSTN.

9 Claims, 16 Drawing Sheets

FIG. 3

| Digit |
|---|
| 1 |
| # |
| * |
| 003○ |
| 003△ |
| ⋮ |
| 004○ |
| 004△ |
| ⋮ |
| 005○ |
| 005△ |
| ⋮ |
| 010○ |
| ⋮ |

TERMINAL CONNECTION DEVICE, CONNECTION CONTROL DEVICE, AND MULTI-FUNCTION TELEPHONE TERMINAL

TECHNICAL FIELD

The present invention relates to a terminal connection device, a connection control device and a multifunctional telephone terminal for providing telephone services on a packet network.

BACKGROUND OF THE INVENTION

Along with the recent advent of information technology (IT), IP telephone services have been provided on the basis of Voice over IP (VoIP) in addition to the conventional public telephone service (Plain Old Telephone System, POTS).

In such circumstances, by connecting a communication terminal as conventionally used such as an analog telephone terminal to a terminal connection device, i.e., a VoIP gateway through which a packet network (IP network) provided for IP telephone service is connected to a public switched telephone network (PSTN) for providing a plain old telephone system, this communication terminal is available for communication with another communication terminal through either or combination of the packet network and the public switched telephone network.

Also, since a packet network and a public switched telephone network are connected together through a gateway device which performs a predetermined signal conversion, the above communication terminal can communicate with other communication terminals which are connected only to the public switched telephone network.

However, there is a problem that the user of the above communication terminal must confirm whether or not the communication with the destination communication terminal is possible through the packet network and instruct the terminal connection device to use which of the packet network and the public switched telephone network for communication.

Then, taking into consideration the above circumstances, it is an object of the present invention to provide a terminal connection device, a connection control device and a multifunctional telephone terminal, with which it is determined which of the packet network and the public switched telephone network is used for communication on the basis of the destination telephone number, and if the packet network cannot be used the communication is performed through the public switched telephone network while the user is informed of the communication path used for communication with the destination communication terminal.

DISCLOSURE OF THE INVENTION

In accordance with a first feature of the present invention, a terminal connection device is connectable to a packet network for transmitting and receiving packet data, a public switched telephone network for transmitting and receiving voice band signals and a communication terminal for sending a connection request which contains a telephone number of a destination, configured to send the connection request to one of the packet network and the public switched telephone network, and comprises: a connection processing unit configured to send the connection request to one of the packet network and the public switched telephone network on the basis of the telephone number of the destination contained in the connection request; and a packet network state judgment unit configured to judge whether or not a communication is viable through the packet network, wherein when the packet network state judgment unit judges that a communication is not viable through the packet network, the connection processing unit sends the connection request to the public switched telephone network even if it is decided to send the connection request to the packet network.

By this configuration, it is determined, on the basis of the destination telephone number contained in the connection request, which of the packet network and the public switched telephone network the terminal connection device sends the connection request to, and therefore it is avoided that the user of the communication terminal has to determine which of the packet network and the public switched telephone network is used for communication.

By this configuration, when the packet network state judgment unit judges that a communication cannot be performed through the packet network, the connection processing unit sends the connection request to the public switched telephone network even if the connection request is judged to be sent to the packet network, the user can perform communication without awareness of whether or not the packet network is available.

In accordance with a second feature of the present invention, in addition to the first feature of the present invention, if predetermined identification information is added to the telephone number of the destination contained in the connection request, the connection request is sent to the public switched telephone network.

By this configuration, when the destination telephone number is concatenated with predetermined identification information such as a succession of a particular number which is distinct from the telephone number itself, the connection request is always sent to the public switched telephone network, and therefore the user of the telephone terminal can arbitrarily and easily designates the public switched telephone network for communication.

In accordance with a third feature of the present invention, in addition to the first feature of the present invention, there is further provided a path information processing unit that receives, from the packet network, predetermined packet data indicating which of a first communication path routed only through the packet network and a second communication path routed through both the packet network and the public switched telephone network is provided for the communication with a communication terminal, to which the telephone number of the destination is assigned, on the basis of the connection request sent to the packet network by the connection processing unit, and transmits to the communication terminal which has sent the connection request a notification signal indicating that which of the first communication path and the second communication path is provided on the basis of the predetermined packet data as received.

In accordance with a fourth feature of the present invention, a connection control device is configured to provide a communication path for communication between a terminal connection device and a communication terminal, to which a telephone number of a destination is assigned, on the basis of a connection request which contains the telephone number of the destination and is transmitted from the terminal connection device connected to a packet network for transmitting and receiving packet signals and a public switched telephone network for transmitting and receiving voice band signals, and comprises: a path information transmitting unit configured to transmit to the terminal connection device predetermined packet data indicating, as the communication path, which of a communication path routed only through the packet network and a communication path routed through both the packet network and the public switched telephone network is provided for the communication terminal to which the telephone number of the destination is assigned.

In accordance with a fifth feature of the present invention, in addition to the fourth feature of the present invention, the path information transmitting unit transmit, to the terminal connection device in place of the predetermined packet data, packet data of a voice band signal indicating which of the communication path routed only through the packet network and the communication path routed through both the packet network and the public switched telephone network is provided for the communication terminal to which the telephone number of the destination is assigned.

In accordance with the third to fifth features of the present invention, the connection processing unit transmits to the telephone terminal, which is sending a connection request, the audible signal indicating which of the communication path routed only through the packet network and the communication path routed through both the packet network and the public switched telephone network is provided for the communication with the telephone terminal to which the destination telephone number is assigned. Accordingly, the user can easily know which of the communication path routed only through the packet network and the communication path routed through both the packet network and the public switched telephone network is provided for the communication with the telephone terminal to which the destination telephone number is assigned.

In accordance with a sixth feature of the present invention, a multifunctional telephone terminal comprises: a sound signal processing unit configured to perform an input/output processing of voice band signals for voice conversation; a connection processing unit configured to select which of a public switched telephone network and a packet network is used for the voice conversation therethrough; a sound signal processing unit configured to perform the conversion process between the voice band signals and packet data which can be communicated through the packet network when the packet network is selected for the voice conversation; a packet transmitter receiver unit configured to transmit and receive, with the packet network, the packet data converted from the voice band signals through an asymmetric digital subscriber line.

By this configuration, the connection processing unit selects which of the public switched telephone network and the packet network is used for voice conversation while the packet transmitter receiver unit transmits and receives the packet data converted from the voice band signals with the IP network through the asymmetric digital subscriber line (ADSL). Because of this, an IP phone service enabling broadband communications can be used only by connecting an conventional telephone line (subscriber line) so that it is possible to dispense with cumbersome connecting and wiring work, and therefore it is avoided that the user of the communication terminal has to determine which of the packet network and the public switched telephone network is used for communication.

In accordance with a seventh feature of the present invention, in addition to the sixth feature of the present invention, when the packet network cannot be used for the voice conversation, the connection processing unit selects the public switched telephone network for the voice conversation therethrough.

By this configuration, even in the case where the communication terminal as the destination is not connected to the packet network, it is possible to connect to the communication terminal as the destination (for example, a multifunctional telephone terminal or a conventional telephone terminal) through the public switched telephone network and therefore the user can perform communication without awareness of whether or not the packet network is available.

In accordance with an eighth feature of the present invention, in addition to the sixth feature of the present invention, there is further provided a base station unit as a PHS (Personal Handyphone System) base station which can communicate with a PHS terminal, wherein the sound signal processing unit performs the input/output processing of the voice band signal with the PHS terminal through the base station.

In accordance with a ninth feature of the present invention, in addition to the sixth feature of the present invention, there is further provided a base unit as a cordless base phone which can communicate with a cordless handset, wherein the sound signal processing unit performs the input/output processing of the voice band signal with the cordless handset through the base unit.

In accordance with a tenth feature of the present invention, in addition to the sixth feature of the present invention, there is further provided a slot into which a communication card can be inserted to enable communication with a personal digital assistant, wherein the packet transmitter receiver unit transmits and receives, with the packet network via the asymmetric digital subscriber line, the packet data which is communicated with the personal digital assistant through the communication card inserted into the slot.

By this configuration, the packet transmitter receiver unit transmits and receives, with the packet network via the asymmetric digital subscriber line, the packet data which is communicated with the personal digital assistant through the communication card inserted into the slot, and therefore a continuous connection Internet service can be provided for the personal digital assistant without need for troublesome connecting and wiring work.

In accordance with an eleventh feature of the present invention, in addition to the sixth feature of the present invention, there is further provided a video phone processing unit which performs the feature/output processing of video signals for video telephony, wherein the video phone processing unit performs the conversion process between the video signals and packet data which can be communicated through the packet network, and wherein the packet transmitter receiver unit transmits and receives, with the packet network via the asymmetric digital subscriber line, the packet data which is communicated with the video phone processing unit.

BRIEF DESCRIPTION OF THE DRAWINGS

FIG. 3 is a schematic diagram showing an example of information stored in the terminal connection device in accordance with the first embodiment of the present invention.

BEST MODE FOR CARRYING OUT THE INVENTION

First Embodiment (Network Configuration Including Connection Devices and Connection Control Devices)

A terminal connection device and a connection control device in accordance with an embodiment of the present invention will be explained in conjunction with the accompanying drawings.

Figure 1:
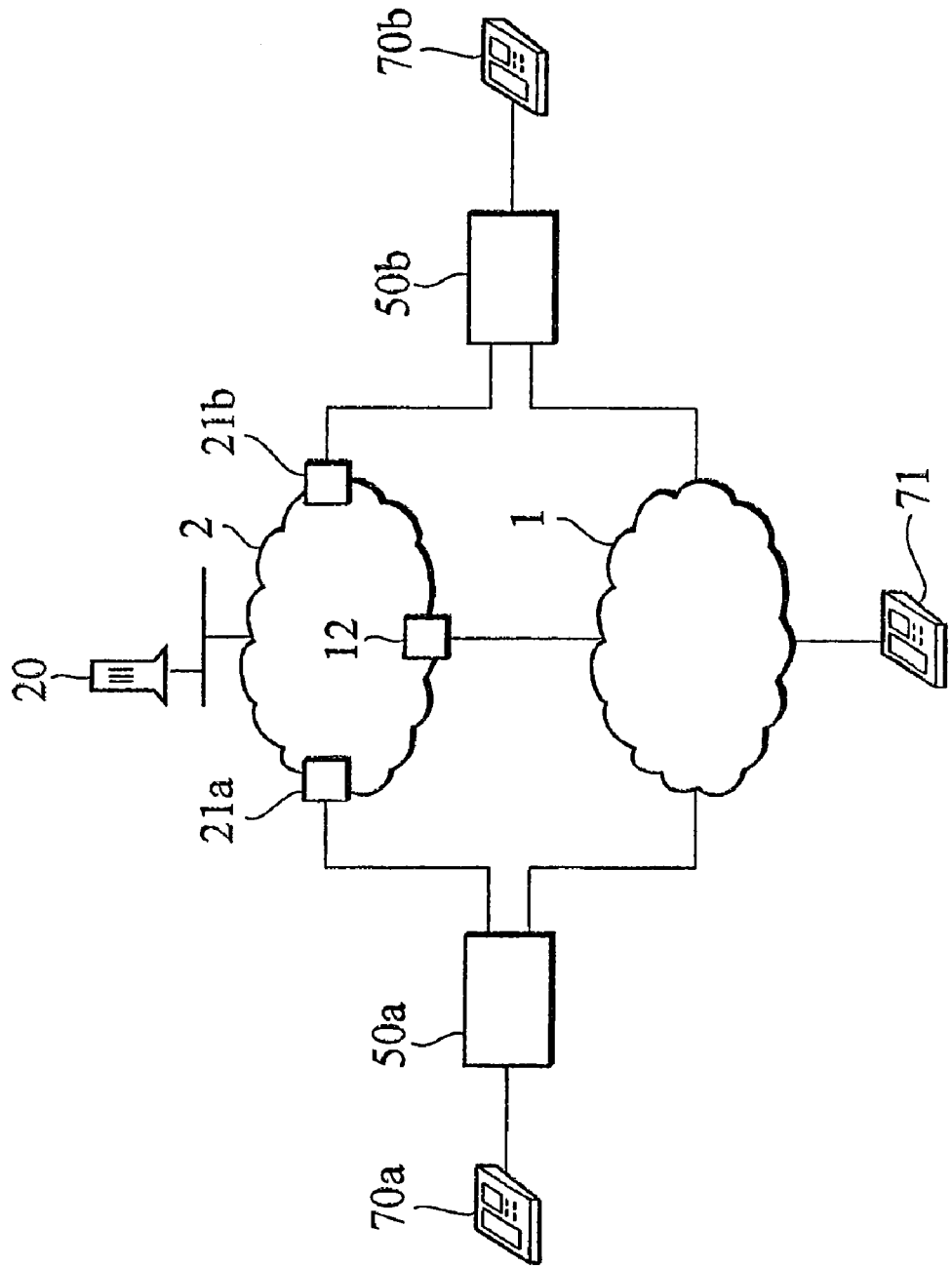
FIG. 1 is a schematic diagram showing the network including a terminal connection device and a connection control device in accordance with a first embodiment of the present invention.

FIG. 1 is a schematic diagram showing the network including the terminal connection device and the connection control device in accordance with the present embodiment. As shown in FIG. 1, a VoIP gateway 50a (the terminal connection device) is connected to a public switched telephone network 1 (referred to herein as PSTN 1) which is a network for providing a plain old telephone system (POTS) and an IP network 2 which is a network for providing an IP telephone service. In addition, a telephone terminal 70a (communication terminal) which is an analog telephone terminal for transmitting and receiving voice band signals is connected to the VoIP gateway 50a.

The VoIP gateway 50a transmits and receives voice band signals with the telephone terminal 70a, and converts the voice band signals into IP packets. In addition, the VoIP gateway 50a transmits and receives voice band signals with the PSTN 1, and transmits and receives IP packets with the IP network 2.

Furthermore, in response to a connection request sent from the telephone terminal 70a, the VoIP gateway 50a of the present embodiment serves to send this connection request to either the PSTN 1 or the IP network 2.

Incidentally, the VoIP gateway 50a are connected to the PSTN 1 and the IP network 2 respectively by an xDSL (Digital Subscriber Line) modem which provides digital transmission over a metallic subscriber line and a splitter which divides the incoming signals into voice band signals and xDSL modem signals. In addition, the xDSL modem may be placed within the VoIP gateway 50a.

On the other hand, a VoIP gateway 50b is also connected to the PSTN 1 and the IP network 2 in the same manner while a telephone terminal 70b is connected to the VoIP gateway 50b. The VoIP gateway 50b has the same functions as the VoIP gateway 50a.

In the case of the present embodiment, the IP network 2 includes L3SWs 21a and 21b which are layer 3 switches for transmitting and receiving IP packets, a gateway 12 for performing the conversion between voice band signals transmitted from/to the PSTN 1 and packet data transmitted to/from the IP network 2, and a call agent 20 for arranging communication paths between telephone terminals.

The call agent 20 serves to establish a communication path between telephone terminals in response to a connection request sent from the VoIP gateway 50a or the VoIP gateway 50b. The call agent 20 in accordance with the present embodiment functions as an MGC (Media Gateway Controller) which can operate in conformity with MGCP (Media Gateway Control Protocol), and performs the process of establishing a communication path in cooperation with the VoIP gateway 50a (50b) or the gateway 12.

On the other hand, in the case of the present embodiment, a telephone terminal 71 which is a digital telephone terminal is connected to the PSTN 1, which is connected to the IP network 2 through the gateway 12.

In the network configuration as has been discussed above, there are a plurality of different paths available between the telephone terminal 70a and the telephone terminal 70b. Namely, the communication path from the telephone terminal 70a to the telephone terminal 70b is established as one of the following paths.

(a) VoIP gateway 50a—L3SW 21a—IP network 2—L3SW 21b—VoIP gateway 50b

(b) VoIP gateway 50a—L3SW 21a—IP network 2—gateway 12—PSTN1—VoIP gateway 50b

(c) VoIP gateway 50a—PSTN1—VoIP gateway 50b

In the case of the present embodiment, the VoIP gateway 50a (50b) and the call agent 20 make, at the start, an attempt to establish a communication path routed through the IP network 2 as much as possible, i.e., the communication path (a) or (b). However, when a failure occurs on the network (for example, at the layer 3 switch), the communication path routed through the IP network 2 and the PSTN 1 over the gateway 12 is established. Alternatively, when the user of the telephone terminal 70a (70b) adds predetermined information to a telephone number for designating the PSTN 1, the VoIP gateway 50a establishes a communication path routed only through the PSTN 1.

Furthermore, in the case where a communication path is established between the telephone terminal 70a or the telephone terminal 70b and the telephone terminal 71 which is connected only to the PSTN 1, one of the following communication paths is selected.

(a) VoIP gateway 50a (50b)—L3SW 21a (21b)—IP network 2—gateway 12—PSTN 1

(b) VoIP gateway 50a (50b)—PSTN 1

Also, in order to establish a communication path between the telephone terminal 70a or the telephone terminal 70b and the telephone terminal 71, the VoIP gateway 50a (50b) and the call agent 20 make, at the start, an attempt to establish a communication path routed through the IP network 2 as much as possible, i.e., the communication path (a). However, if the communication uses a special service which is not supported by the IP network 2 (for example, the service asking the receiving party to pay for the call), the communication path (b) is selected.

(Configuration of Terminal Connection Device)

Next, the functional block configuration of the terminal connection device, i.e., the VoIP gateway 50a in accordance with the present embodiment will be explained with reference to FIG. 2. Meanwhile, since the VoIP gateway 50b has the same configuration as the VoIP gateway 50a, the following explanation is directed only to the configuration of the VoIP gateway 50a.

Figure 2:
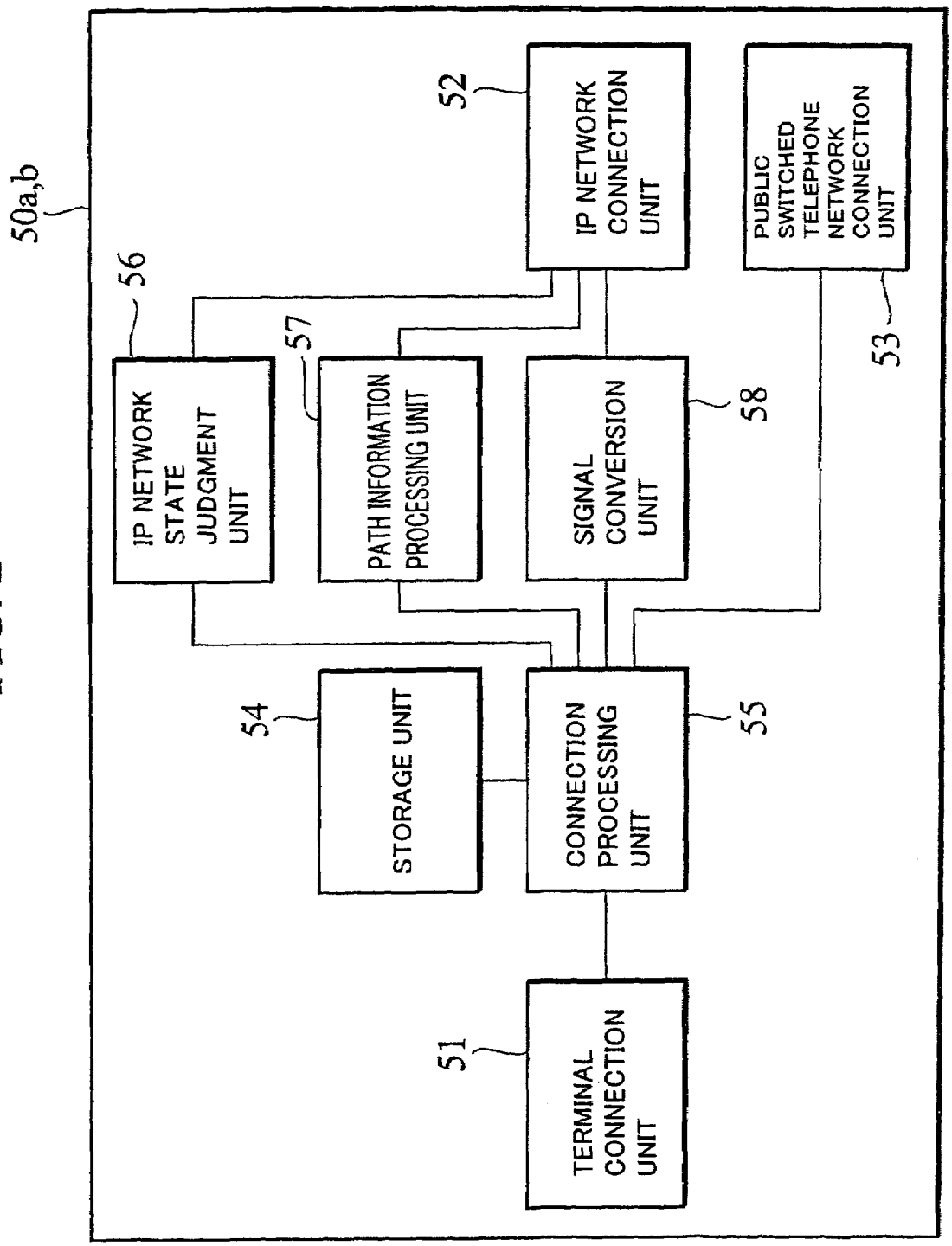
FIG. 2 is a functional block diagram showing the terminal connection device in accordance with the first embodiment of the present invention.

As shown in FIG. 2, the VoIP gateway 50a includes a terminal connection unit 51, an IP network connection unit 52, a public switched telephone network (PSTN) connection unit 53, a storage unit 54, a connection processing unit 55, an IP network state judgment unit 56, a path information processing unit 57 and a signal conversion unit 58.

The terminal connection unit 51 provides an interface for connection with the telephone terminal 70a. More specifically speaking, the terminal connection unit 51 employs the FXS (Foreign Exchange Station) interface having an RJ-11 connector for transmitting and receiving voice band signals with the telephone terminal 70a. In addition to this, the terminal connection unit 51 is capable of supplying the telephone terminal 70a with necessary power for the operation thereof.

The IP network connection unit 52 provides an interface for connection with a subscriber line of the IP network 2, and has a LAN interface such as 100BASE-TX. For example, the IP network connection unit 52 is connected to a metallic subscriber line through an xDSL modem. Also, as has been discussed above, in the case where the VoIP gateway 50a includes an xDSL modem therein, the IP network connection unit 52 serves also as the xDSL modem. In such a case, the IP network connection unit 52 is provided with an RJ-11 connector for transmitting and receiving XDSL modem signals, and connected to a metallic subscriber line.

The PSTN connection unit 53 provides an interface for connection with a subscriber line of the PSTN 1, and has an FXO (Foreign Exchange Office) interface having an RJ-11 connector. For example, in the case where the IP network connection unit 52 is connected to a metallic subscriber line through an XDSL modem, the PSTN connection unit 53 is connected to the metallic subscriber line through a splitter.

The storage unit 54 is used to store information in which destination telephone numbers are associated respectively with the IP network 2 or the PSTN 1. More specifically speaking, the storage unit 54 stores the necessary information, as a "PSTN route-around table", about the telephone numbers of destinations for which communication are necessarily established through the PSTN 1. The storage unit 54 forcibly sends to the PSTN 1 a connection request, which cannot be passed through the IP network 2, such as a request for communication relating to a special service (for example, the service asking the receiving party to pay for the call) or an urgent message to police and so forth.

Figure 3:
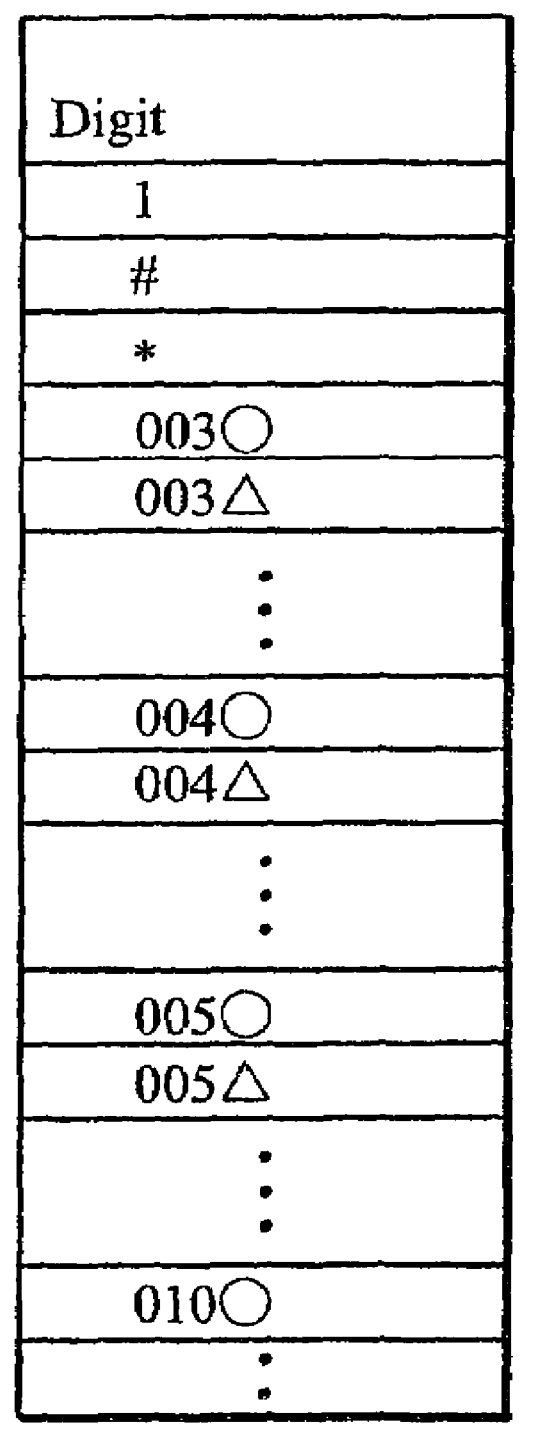

FIG. 3 is a diagram shows an example of the "PSTN route-around table" as stored in the storage unit 54. For example, as described in the first entry of the "PSTN route-around table", if the first digit is "1" in the destination telephone number contained in a connection request as sent from the telephone terminal 70a, the connection processing unit 55 to be described below judges that the connection request is to be sent to the PSTN 1. Also, in the case of the destination telephone number beginning with "003X", "003Y" and the like, the connection request is judged to be sent to the PSTN 1 in the same manner.

Also, the storage unit 54 may store information about the telephone numbers of destinations for which communication are necessarily established through the IP network 2 in addition to the information about the telephone numbers of destinations for which communication are necessarily established through the PSTN 1.

The connection processing unit 55 serves to send a connection request to either the IP network 2 or the PSTN 1 on the basis of the information stored in the storage unit 54 and the destination telephone number contained in the connection request as sent from the telephone terminal 70a. Also, even if a connection request is decided to be sent to the IP network 2, the connection processing unit 55 sends the connection request to the PSTN 1 when the IP network state judgment unit 56 judges that the communication through the IP network 2 is impossible. Furthermore, if a destination telephone number includes predetermined identification information, the connection processing unit 55 can forcibly send the connection request to the PSTN 1.

More specifically speaking, the connection processing unit 55 acquires a destination telephone number contained in the connection request as sent from the telephone terminal 70a, and compares the telephone number as acquired with the "PSTN route-around table" stored in the storage unit 54. When the telephone number matches one of the patterns of telephone numbers as listed in the "PSTN route-around table", the connection processing unit 55 sends the connection request to the PSTN 1.

Conversely, when the telephone number does not match any of the patterns of telephone numbers as listed in the "PSTN route-around table", the connection processing unit 55 sends the connection request to the IP network 2 through the signal conversion unit 58 and the like by the use of an NTFY (Notification) command defined in MGCP.

Also, if four successive "0"s are prefixed to the beginning of the destination telephone number contained in the connection request as sent from the telephone terminal 70a, the connection processing unit 55 in accordance with the present embodiment sends the connection request to the PSTN 1 irrespective of whether or not the telephone number matchs one of the patterns of telephone numbers as listed in the "PSTN route-around table".

Accordingly, the user of the telephone terminal 70a can arbitrarily and easily designates the PSTN 1 for communication at any time only by prefixing four "0"s to the beginning of the destination telephone number.

Furthermore, the connection processing unit 55 can receive the judgment result of whether or not the communication through the IP network 2 is viable from the IP network state judgment unit 56. When it is judged that the communication through the IP network 2 is not viable, the connection processing unit 55 sends a connection request to the PSTN 1 even if the connection request is judged to be sent to the IP network 2 on the basis of the destination telephone number. Since the connection processing unit 55 operates as has been discussed above, the user of the telephone terminal 70a can perform communication without awareness of whether or not the IP network 2 is available.

The connection processing unit 55 serves to perform the process of the connection request as received in addition to the process of sending the connection request as described above. Specifically, the connection processing unit 55 processes a connection request such as a CRCX (Create Connection) command transmitted from the IP network 2, and send, through the terminal connection unit 51, voice band signals converted from packet data by the signal conversion unit 58 to the telephone terminal 70*a*. Also, the connection processing unit 55 processes a connection request as received from the PSTN 1, and transmits, through the terminal connection unit 51, voice band signals as received through the PSTN connection unit 53 to the telephone terminal 70*a*.

The IP network state judgment unit 56 judges whether or not the communication through the IP network 2 is viable, and serves as a packet network state judgment unit in the case of the present embodiment.

More specifically speaking, the IP network state judgment unit 56 transmits an ICMP (Internet Control Message Protocol) Echo request packet to the L3SW 21*a* through a subscriber line connected to the IP network connection unit 52, and monitors a response from the L3SW 21*a* responsive to the Echo request packet. The IP network state judgment unit 56 periodically sends the Echo request packet to the L3SW 21*a*, and if a predetermined response is not received, it is judged that the communication through the IP network 2 is not viable. Incidentally, the judgment method of judging the state of the IP network 2 by the IP network state judgment unit 56 will be specifically described later. Also, while ICMP is used to judge whether or not the communication through the IP network 2 is viable in the case of the present embodiment, any other appropriate network management protocol such as SNMP (Simple Network Management Protocol) 2 is available for the same purpose.

The path information processing unit 57 receives, from the IP network 2, predetermined packet data indicating which of the communication path routed only through the IP network 2 and the communication path routed through both the IP network 2 and the PSTN 1 is provided for the communication with the telephone terminal, to which the destination telephone number is assigned, on the basis of the connection request sent to the IP network 2 by the connection processing unit 55. Also, the path information processing unit 57 transmits a notification signal to the telephone terminal 70*a*, which has sent the connection request, for informing the telephone terminal 70*a* of which of the communication path routed only through the IP network 2 and the communication path routed through both the IP network 2 and the PSTN 1 is provided.

In particular, after receiving an MDCX (modify connection) command as prepared under the predetermined rule from the call agent 20, the path information processing unit 57 transmits an audible signal having a predetermined ON/OFF pattern through the connection processing unit 55 and the terminal connection unit 51 to the telephone terminal 70*a*.

Figure 4:
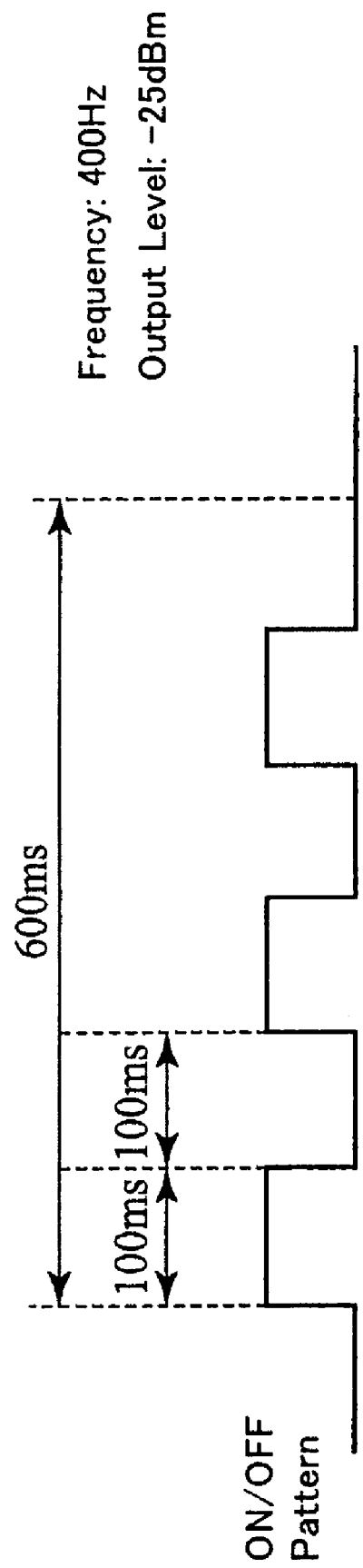
FIG. 4 is a schematic diagram showing an exemplary path notification signal transmitted from the terminal connection device in accordance with the first embodiment of the present invention.

FIG. 4 shows an exemplary pattern of the signal transmitted to the telephone terminal 70*a* in response to the MDCX command. The path information processing unit 57 transmits a 400 Hz signal at a transmission level of −25 dBm to the telephone terminal 70*a* as illustrated in FIG. 4 once each time the MDCX command is received. Accordingly, the user of the telephone terminal 70*a* can hear an audible tone such as "Poo Poo Poo" when the signal shown in FIG. 4 is output by the telephone terminal 70*a*. Meanwhile, a more specific description of the method of notifying the route information about the communication path by the use of the MDCX command and the above signal will be described below.

The signal conversion unit 58 is located between the IP network connection unit 52 and the connection processing unit 55 to perform the conversion between voice band signals and packet data. In particular, a CODEC in conformity to ITU-T G.729a/b and the like is implemented in the signal conversion unit 58, and the signal conversion unit 58 can perform the conversion between packet data and voice band signals as digitized by the CODEC. Furthermore, the signal conversion unit 58 serves to add or remove an RTP (Real-time Transport Protocol) header which is used for the purpose of transmitting IP packets on a real-time base.

(Configuration of Connection Control Device)

Next, with reference to FIG. 5, the configuration of the connection control device in accordance with the present embodiment, i.e., the call agent 20 will be explained.

Figure 5:
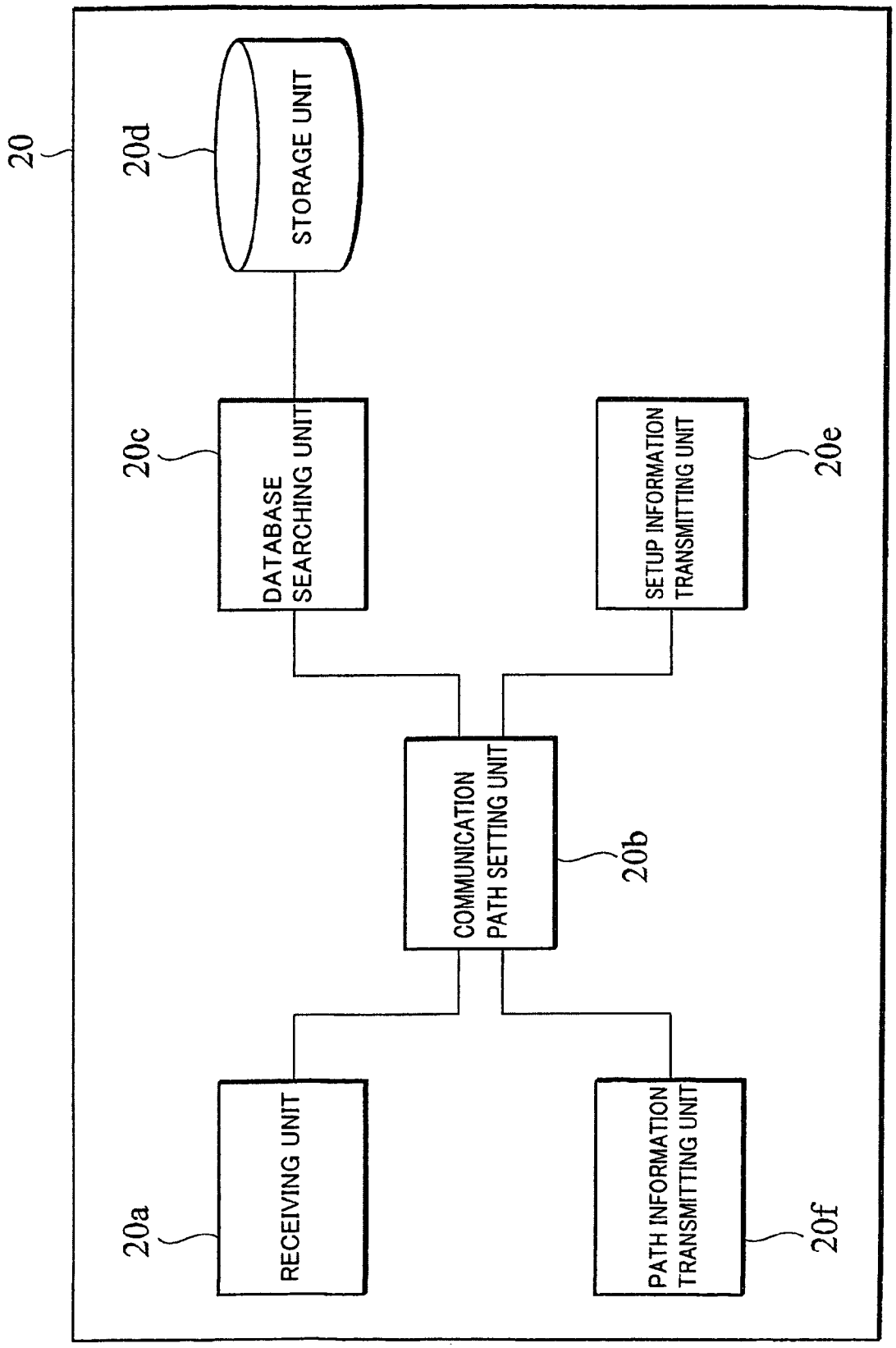
FIG. 5 is a functional block diagram showing the connection control device in accordance with the first embodiment of the present invention.

As shown in FIG. 5, the call agent 20 comprises a receiving unit 20*a*, the communication path setting unit 20*b* and a database searching unit 20*c*, a storage unit 20*d*, a path information transmitting unit 20*f* and a setup information transmitting unit 20*e*.

The receiving unit 20*a* receives a connection request including a destination telephone number from the VoIP gateway 50*a* or the VoIP gateway 50*b*. More specifically speaking, the receiving unit 20*a* receives an NTFY command transmitted from the VoIP gateway 50*a* (50*b*) on the basis of MGCP or a response (ACK) and the like sent in response to an RQNT (Request Notification) command and the like as transmitted from the setup information transmitting unit 20*e*. Furthermore, the receiving unit 20*a* transmits the parameter of a command as received or a response as received to the communication path setting unit 20*b*.

The storage unit 20*d* serves to store the telephone numbers assigned to the telephone terminal 70*a* and the telephone terminal 70*b* in association with IP addresses assigned to the VoIP gateway 50*a*, the VoIP gateway 50*b* and the gateway 12.

The database searching unit 20*c* serves to search the information about the telephone numbers and IP addresses stored in the storage unit 20*d* in accordance with the instruction of the communication path setting unit 20*b*, and notify the search results to the communication path setting unit 20*b*.

The communication path setting unit 20*b* acquires the IP address associated with the destination telephone number from the database searching unit 20*c* with reference to the parameter of a command as transmitted from the receiving unit 20*a*, and transmits and receives an IP address, a port number, an RTP profile which are required for setting a communication path on the basis of the SDP (Session Description Protocol).

For example, when setting a communication path between the telephone terminal 70*a* and the telephone terminal 70*b*, the communication path setting unit 20*b* transmits, to the VoIP gateway 50*b*, information such as the telephone number of the telephone terminal 70*b*, the IP address of the VoIP gateway 50*a*, the port number to be used, the RTP profile and other information of the VoIP gateway 50*a* on the basis of the connection request as sent from the VoIP gateway 50*a*.

In this case, if the VoIP gateway 50*b* does not return a response within a predetermined period, the communication path setting unit 20*b* judges that it is impossible to use the communication path routed only through the IP network 2, and transmits the information indicative of this fact to the gateway 12. The gateway 12 transfers the necessary information such as the telephone number of the telephone terminal 70*b* to the PSTN 1 on the basis of the information as transmitted from the communication path setting unit 20*b* through the setup information transmitting unit 20*e*. On the other hand, also in the case where the telephone terminal to which the destination telephone number is assigned is a terminal connected only to the PSTN 1 (i.e., the telephone terminal 71 in the case of the present embodiment), the communication path setting unit 20b transmits the information to the gateway 12.

In this way, either the communication path routed only through the IP network 2 and the communication path routed through both the IP network 2 and the PSTN 1 is provided for the communication between the telephone terminal 70a and the telephone terminal 70b.

The path information transmitting unit 20f transmits to the VoIP gateway 50a (50b) packet data prepared to indicate which of the communication path routed only through the IP network 2 and the communication path routed through both the IP network 2 and the PSTN 1 is provided for the telephone terminal.

In particular, the path information transmitting unit 20f receives from the communication path setting unit 20b the information indicating which of the communication path routed only through the IP network 2 and the communication path routed through both the IP network 2 and the PSTN 1 is provided for communication. The path information transmitting unit 20f transmits an MDCX packet prepared on the basis of the information as received to the VoIP gateway 50a (50b) which has sent the connection request. In the case of the present embodiment, when the communication path routed only through the IP network 2 is provided, the path information transmitting unit 20f transmits a corresponding MDCX packet to the VoIP gateway 50a (50b) twice. Also, when the communication path routed through both the IP network 2 and the PSTN 1 is provided, the path information transmitting unit 20f transmits a corresponding MDCX packet to the VoIP gateway 50a (50b) only one time.

Alternatively, in place of the above MDCX packet, the path information transmitting unit 20f may transmit, to the VoIP gateway 50a (50b), packet data of a voice band signal indicating which of the communication path routed only through the IP network 2 and the communication path routed through both the IP network 2 and the PSTN 1 is provided for the communication terminal to which the destination telephone number is assigned.

More specifically speaking, when the communication path routed only through the IP network 2 is provided, the path information transmitting unit 20f transmits twice the IP packet corresponding to the voice band signal as illustrated in FIG. 4 to the VoIP gateway 50a (50b). Also, when the communication path routed through both the IP network 2 and the PSTN 1 is provided, the path information transmitting unit 20f transmits once the IP packet corresponding to the voice band signal as illustrated in FIG. 4 to the VoIP gateway 50a (50b).

(Procedure of Requesting a Connection by Terminal Connection Device)

Figure 6:
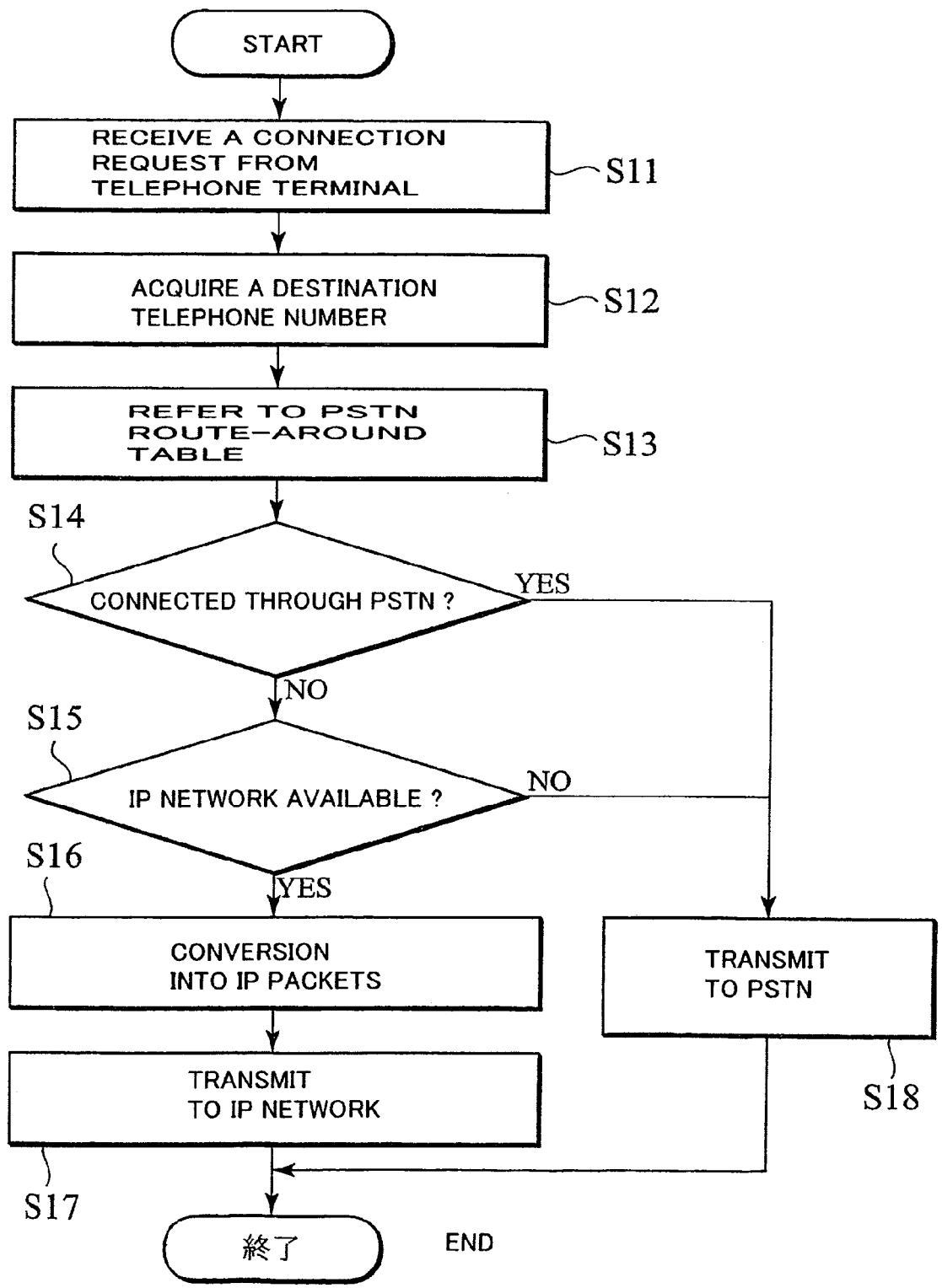
FIG. 6 is a flowchart showing the procedure of requesting a connection by the terminal connection device in accordance with the first embodiment of the present invention.

Next, the procedure of requesting a connection by the terminal connection device, i.e., the VoIP gateway 50a (50b) in accordance with the present embodiment will be explained with reference to FIG. 6. Meanwhile, since the VoIP gateway 50b has the same configuration as the VoIP gateway 50a, the following explanation is directed only to the configuration of the VoIP gateway 50a.

At first, when the user of the telephone terminal 70a off-hooks the telephone terminal 70a and dials the destination telephone number, the VoIP gateway 50a receives a connection request containing the telephone number as sent from the telephone terminal 70a (S11). The VoIP gateway 50a acquires the telephone number data, and temporarily stores the data in the connection processing unit 55 (S12).

Next, the VoIP gateway 50a referrs to the "PSTN route-around table" stored in the storage unit 54 (S13) and compares the telephone number stored in the connection processing unit 55 to the entries of the "PSTN route-around table" in order to judge whether or not the connection request is to be sent to the PSTN 1 (S14).

If the telephone number stored in the connection processing unit 55 does not match any of the patterns of telephone numbers as listed in the "PSTN route-around table" in step S14 so that the connection request is judged to be sent to the IP network 2, the VoIP gateway 50a judges whether or not the connection request can be sent to the IP network 2 (S15) on the basis of the judgment of the IP network state judgment unit 56 about whether or not the IP network 2 is available.

When the VoIP gateway 50a judges in step S15 that the connection request is to be sent to the IP network 2, the connection request is converted to an IP packet (NTFY command) (S16). Furthermore, the VoIP gateway 50a transmits the IP packet to the IP network 2 (S17).

The NTFY command as transmitted to the IP network 2 in step S17 is processed by the call agent 20, and then the communication path between the telephone terminal 70a and the telephone terminal corresponding to the destination telephone number is provided.

On the other hand, when the VoIP gateway 50a judges that the connection request is to be sent to the PSTN 1 in step S14 or when the IP network 2 is judged to be not available in step S15, the VoIP gateway 50a sends the connection request to the PSTN 1 (S18).

Figure 7:
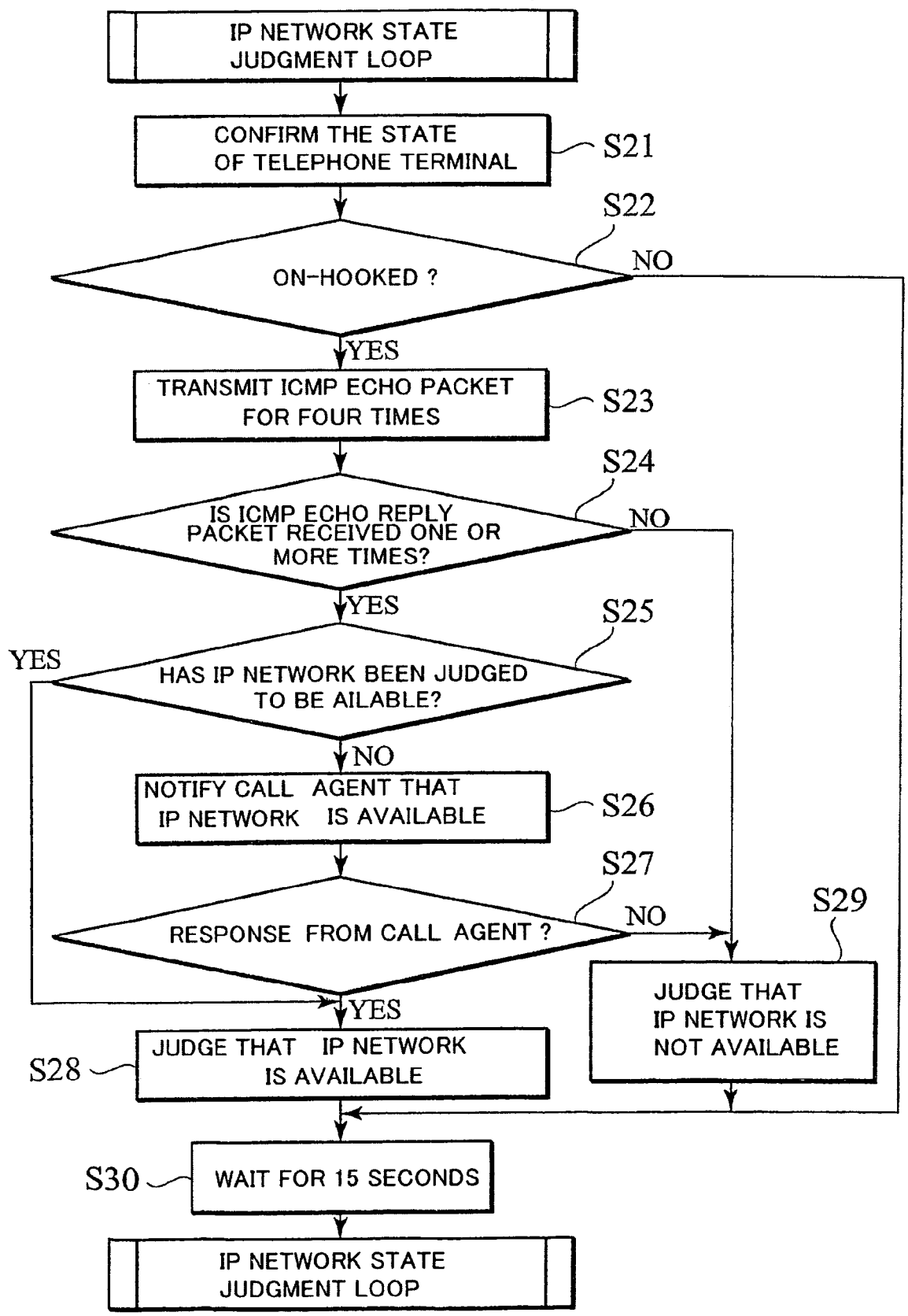
FIG. 7 is a flowchart showing the operation of a packet network state judgment unit in accordance with the first embodiment of the present invention.

Next, the method of judging the state of the IP network 2 by the IP network state judgment unit 56 of the VoIP gateway 50a in accordance with the present embodiment will be explained with reference to FIG. 7.

At first, the IP network state judgment unit 56 confirms whether the telephone terminal 70a is in an on-hook state or an off-hook state (S21). The IP network state judgment unit 56 judges that the telephone terminal 70a is not being used when the telephone terminal 70a is in an on-hook state, and that the telephone terminal 70a is being used when the telephone terminal 70a is in an off-hook state (S22).

If the telephone terminal 70a is judged to be in an on-hook state in step S22, the IP network state judgment unit 56 transmits an ICMP Echo packet for four times to the L3SW 21a which is connected to the VoIP gateway 50a through a subscriber line (S23). Next, the IP network state judgment unit 56 confirms whether or not it receives, from the L3SW 21a, for one or more times an ICMP Echo Reply packet which is a response to the ICMP Echo packet (S24).

When an ICMP Echo Reply packet is received from the L3SW 21a for one or more times in step S24, the IP network state judgment unit 56 performs different processes (S25) depending upon whether or not the IP network 2 was judged to be available just before the latest execution of step S22.

Namely, when the IP network 2 was judged to be available just before the latest execution of step S22, the IP network state judgment unit 56 continues judging that the IP network 2 is available ("YES" in step S25, and step S28).

Conversely, when the IP network 2 was judged to be not available just before the latest execution of step S22, the IP network state judgment unit 56 notifies the call agent 20 that the IP network 2 is available for the VoIP gateway 50a (S26). Next, the IP network state judgment unit 56 confirms whether or not there is a response to the notification from the call agent 20 (S27). If there is a response from the call agent 20 in step S27, the IP network state judgment unit 56 judges that the IP network 2 is available (S28).

Conversely, if there is no response from the call agent 20 in step S27, the IP network state judgment unit 56 judges that the IP network 2 is not available (S29). Incidentally, also when the IP network state judgment unit 56 does not receive an ICMP Echo Reply packet at all from the L3SW 21a in step S24, the IP network state judgment unit 56 judges that the IP network 2 is not available.

Thereafter, the IP network state judgment unit 56 waits for 15 seconds after step S28 or step S29, and then repeats the process as described above from step S21 (S30). Also, when the telephone terminal 70a is judged to be in an off-hook state in step S22, the IP network state judgment unit 56 waits for 15 seconds after step S22, and then repeats the process as described above from step S21.

Incidentally, while the IP network state judgment unit 56 judges the state of the IP network 2 by transmitting and receiving predetermined ICMP packets in the case of the present embodiment, SNMP request and response packets defined by IETF RFC1901 and so forth can be exchanged between the VoIP gateway 50a and the L3SW 21a for the same purpose in place of the ICMP packets. Alternatively, the VoIP gateway 50a may be designed to send and receive such requests or responses with the call agent 20 or any another appropriate network device (not shown in the figure) of the IP network 2 in place of the L3SW 21a.

(Communication Procedure by the Use of Terminal Connection Device and Connection Control Device)

Next, the communication procedure by the use of the terminal connection device and the connection control device in accordance with the present embodiment, i.e., by the use of the VoIP gateway 50a, the VoIP gateway 50b and the call agent 20 will be explained with reference to FIG. 8 and FIG. 9.

Figure 8:
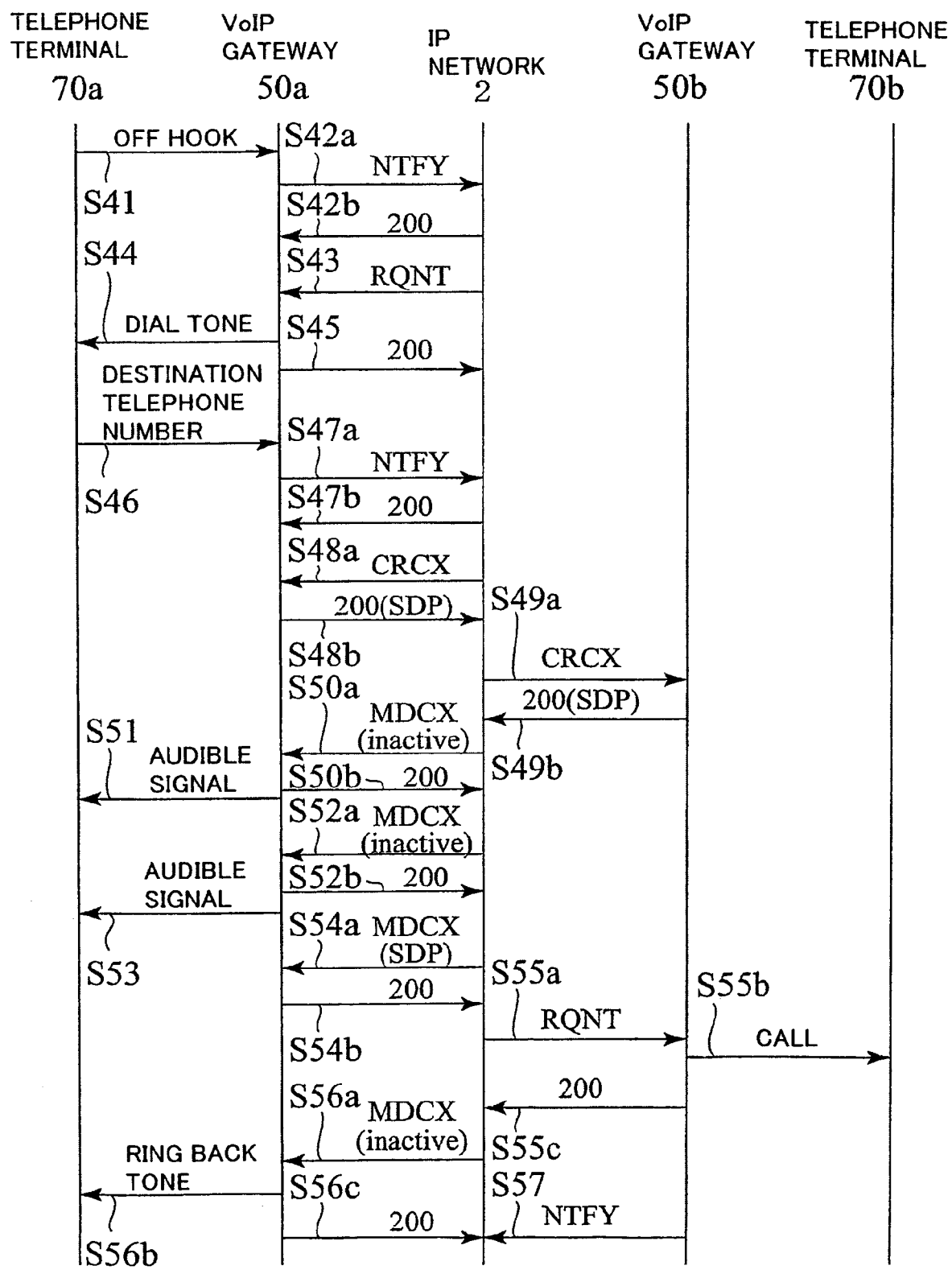
FIG. 8 is a sequence diagram showing a communication procedure in accordance with the first embodiment of the present invention.

FIG. 8 is a schematic diagram showing the communication procedure in which the communication path is provided for the communication between the telephone terminal 70a and the telephone terminal 70b, i.e., between the VoIP gateway 50a and the VoIP gateway 50b, through the IP network 2. Incidentally, this communication procedure will be explained in the case where the IP network 2 is judged to be available by the IP network state judgment unit 56 of the VoIP gateway 50a as discussed above.

At first, the telephone terminal 70a is off-hooked (S41) for the purpose of getting into communication with the telephone terminal 70b. The VoIP gateway 50a connected to the telephone terminal 70a transmits an NTFY command indicative of the off-hook state of the telephone terminal 70a to the IP network 2 (S42a). The IP network 2 sends to the VoIP gateway 50a a response (return code 200) to the NTFY command (S42b).

Furthermore, the IP network 2 transmits to the VoIP gateway 50a an RQNT (Request Notification) command so that the VoIP gateway 50a transmits the information about the destination telephone number and the like (S43).

After receiving the RQNT command, the VoIP gateway 50a transmits to the telephone terminal 70a a dial tone indicating that the destination telephone number can be sent (S44). Also, the VoIP gateway 50a sends to the IP network 2 a response to the RQNT command (S45).

Thereafter, the telephone terminal 70a sends a connection request containing the telephone number of the telephone terminal 70b (the destination telephone number) to the VoIP gateway 50a (S46).

After receiving the connection request, the VoIP gateway 50a transmits to the IP network 2 an NTFY command containing the destination telephone number contained in the connection request (S47a). The IP network 2 sends to the VoIP gateway 50a a response to the NTFY command (S47b).

Furthermore, the IP network 2 transmits to the VoIP gateway 50a a CRCX command indicating that the IP network 2 is ready for receiving the IP address and port number to be used of the VoIP gateway 50a which are required for arranging a communication path (S48a). After receiving the CRCX command, the VoIP gateway 50a transmits to the IP network 2, by the use of SDP, the IP address and port number to be used of the VoIP gateway 50a and the RTP profile for use in the communication from the VoIP gateway 50a to the VoIP gateway 50b (S48b).

Next, the IP network 2 transmits to the VoIP gateway 50b the information transmitted from the VoIP gateway 50a as a CRCX command (S49a). After receiving the CRCX command, the VoIP gateway 50b transmits to the IP network 2 the information such as the port number and RTP profile for use in the communication from the VoIP gateway 50b to the VoIP gateway 50a, by the use of SDP (S49b).

After receiving the above information from the VoIP gateway 50b, the IP network 2 transmits to the VoIP gateway 50a a predetermined MDCX command (an MDCX command in inactive mode) (S50a). The VoIP gateway 50a transmits to the IP network 2 a response to the MDCX command (S50b), and transmits to the telephone terminal 70a an audible signal having the predetermined ON/OFF pattern as illustrated in FIG. 4 (S51). Furthermore, the IP network 2 and the VoIP gateway 50a performs again the process between step S50a and step S51 (from step S52a to step S53).

As thus described, when a communication path is provided for communication between the telephone terminal 70a and the telephone terminal 70b, the IP network 2 transmits twice the MDCX command as described above to the VoIP gateway 50a (S50a and S52a). By this process, an audible signal having the predetermined ON/OFF pattern as illustrated in FIG. 4 is output twice from the telephone terminal 70a.

In this case, it is assumed that the users are notified in advance that a communication path routed only through the IP network 2 is set when this audible signal is output twice from the telephone terminal 70a.

Accordingly, the user of the telephone terminal 70a is informed that a communication path routed only through the IP network 2 is provided for communication between the telephone terminal 70a and the telephone terminal 70b when an audible signal such as "poo-poo-poo, poo-poo-poo" can be heard from the telephone terminal 70a.

Next, the IP network 2 transmits to the VoIP gateway 50a the information which is transmitted from the VoIP gateway 50b by the use of SDP in step S49b (S54a). The VoIP gateway 50a receives the information and sends to the IP network 2 a response indicating that it is ready for communication (S54b).

After receiving the response from the VoIP gateway 50a, the IP network 2 transmits to the VoIP gateway 50b an RQNT command instructing the VoIP gateway 50a to call the telephone terminal 70b (S55a). After receiving the RQNT command, the VoIP gateway 50b calls the telephone terminal 70b (S55b), and sends to the IP network 2 a response to the RQNT command (S55c).

After receiving the response from the VoIP gateway 50b, the IP network 2 transmits to the VoIP gateway 50a an MDCX command indicating that the VoIP gateway 50b calls the telephone terminal 70b (S56a). After receiving the MDCX command, the VoIP gateway 50a transmits to the telephone terminal 70*a* a ring back tone (S56*b*), and sends to the IP network 2 a response to the MDCX command (S56*c*).

Thereafter, the VoIP gateway 50*b* transmits to the IP network 2 an NTFY command indicating that the user of the telephone terminal 70*b* responds to the call in step S55*b* and then the telephone terminal 70*b* is off-hooked (S57). When the process in step S57 is completed, communication is started between the telephone terminal 70*a* and the telephone terminal 70*b* by the use of the communication path routed through the IP network 2.

Incidentally, while the audible signal notifying the telephone terminal 70*a* that a communication path is set through the IP network 2 is transmitted (in the above steps S51 and S53) in advance of transmitting a ring back tone (in the above step S56*b*) in the case of the present embodiment, it is possible to transmit the audible signal and the MDCX command (in the above steps S50*a* and S52*a*) at another appropriate timing, for example, when conversation becomes possible between the telephone terminal 70*a* and the telephone terminal 70*b* (in the above step S57).

Also, it is possible to transmit an IP packet corresponding to the audible signal (voice band signal) shown in FIG. 4 from the IP network 2 in place of the MDCX command (in the above steps S50*a* and S52*a*). In this case, the IP packet is transmitted to the telephone terminal 70*a* from the call agent 20 located on the IP network 2.

Figure 9:
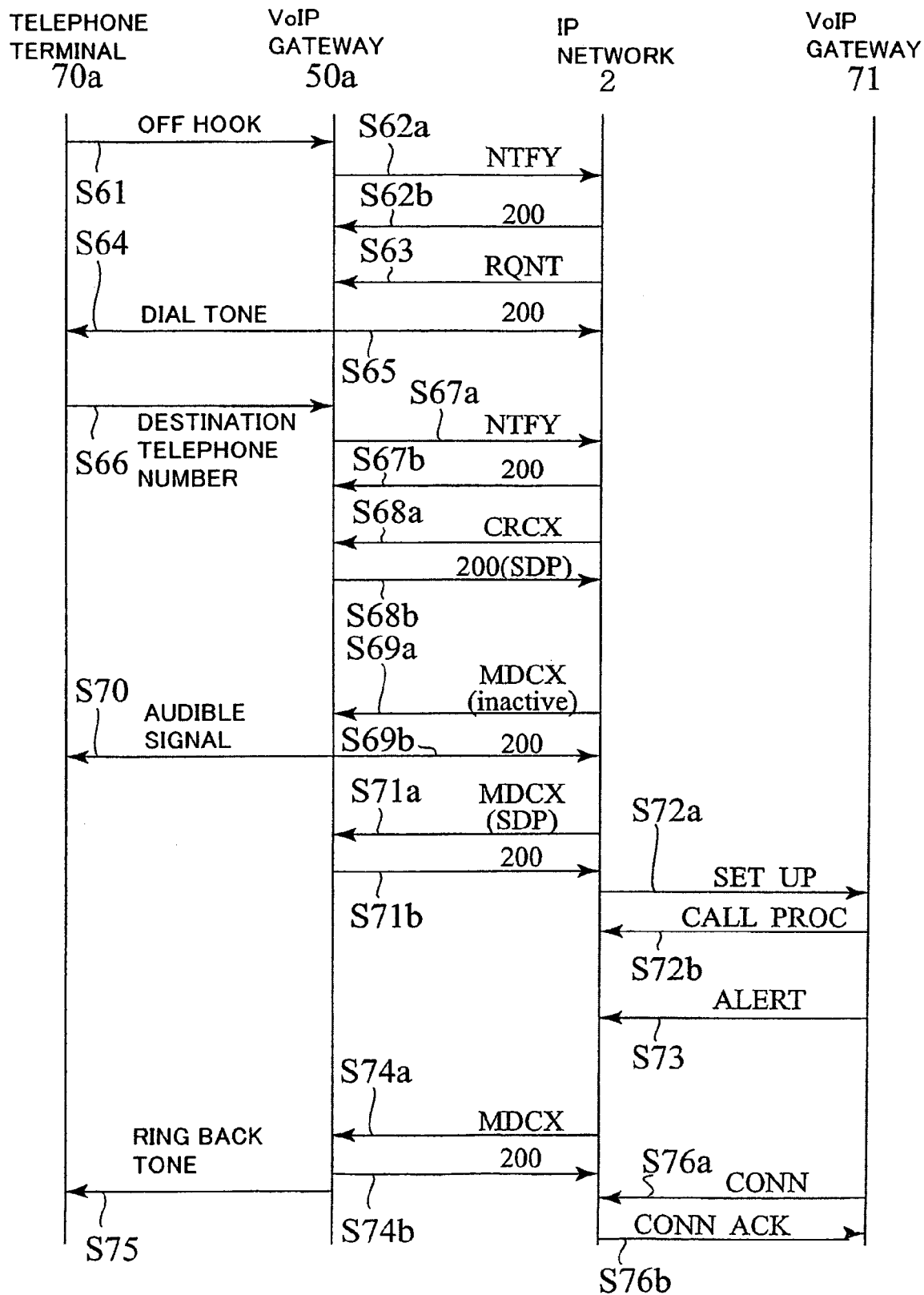
FIG. 9 is a sequence diagram showing a communication procedure in accordance with the first embodiment of the present invention.

FIG. 9 is a schematic diagram showing the communication procedure of providing a communication path routed through the IP network 2 and the PSTN 1 between the telephone terminal 70*a* and the telephone terminal 71 which is connected only to the PSTN 1.

Incidentally, in the same manner as the communication procedure shown in FIG. 8, this communication procedure will be explained in the case where the IP network 2 is judged to be available by the IP network state judgment unit 56 of the VoIP gateway 50*a* as discussed above. Also, since the process from step S61 to step S68*b* shown in FIG. 9 is corresponding to the process from step S41 to step S48*b* shown in FIG. 8, the explanation thereof is omitted and directed to the process from step S69*a*.

After receiving an NTFY command containing the telephone number of the telephone terminal 71 from the VoIP gateway 50*a* in step S67*a*, the IP network 2 judges, on the basis of the telephone number, that a communication path is set to be routed through the IP network 2 and the PSTN 1 via the gateway 12, and transmits a predetermined MDCX packet to the VoIP gateway 50*a* (S69*a*). The VoIP gateway 50*a* sends to the IP network 2 a response to the above MDCX packet (S69*b*), and transmits to the telephone terminal 70*a* an audible signal having the predetermined ON/OFF pattern as illustrated in FIG. 4 (S70).

As thus described, when a communication path is set to be routed through the IP network 2 and the PSTN 1 between the telephone terminal 70*a* and the telephone terminal 71, the IP network 2 transmits the predetermined MDCX packet once to the VoIP gateway 50*a*. By this process, an audible signal having the predetermined ON/OFF pattern as illustrated in FIG. 4 is output once from the telephone terminal 70*a*.

In this case, it is assumed that the users are notified in advance that a communication path routed through the IP network 2 and the PSTN 1 is set when this audible signal is output once from the telephone terminal 70*a*.

Accordingly, the user of the telephone terminal 70*a* is informed that a communication path routed through the IP network 2 and the PSTN 1 is provided for communication between the telephone terminal 70*a* and the telephone terminal 71 when an audible signal such as "poo-poo-poo" can be heard from the telephone terminal 70*a*.

Next, the IP network 2 transmits to the VoIP gateway 50*a* the information such as the IP address and port number of the gateway 12 and the RTP profile for use in the communication, by the use of SDP (S71*a*). The VoIP gateway 50*a* receives this information, and sends to the IP network 2 a response indicating that it is ready for communication (S71*b*).

After receiving the response from the VoIP gateway 50*a*, the IP network 2 sends to the telephone terminal 71 a connection request message (SET UP message) through the gateway 12 (S72*a*). The telephone terminal 71 sends to the IP network 2 a CALL PROC (Call Processing) message indicating that the connection request is being processed (S72*b*).

Also, the telephone terminal 71 sends to the IP network 2 an ALERT message indicative of starting calling the user of the telephone terminal 71, i.e., outputting a ringing tone from the telephone terminal 71 (S73).

After receiving the ALERT message, the IP network 2 transmits to the VoIP gateway 50*a* an MDCX message for transmitting a ring back tone (S74*a*). After receiving the MDCX message, the VoIP gateway 50*a* sends to the IP network 2 a response to the MDCX message (S74*b*), and transmits the ring back tone to the telephone terminal 70*a* (S75).

Thereafter, the telephone terminal 71 sends to the IP network 2 a CONN (Connect) message indicating that the telephone terminal 71 responds to the call which is started in step S73 and that the telephone terminal 71 is off-hooked (S76*a*).

After receiving the CONN message, the IP network 2 sends to the telephone terminal 71 a CONN ACK (Connect Acknowledge) message indicative of the acknowledge of the CONN message 71 (S76*b*).

After completing the process in step S76*b*, communication is started between the telephone terminal 70*a* and the telephone terminal 71 by the use of the communication path routed through the IP network 2 and the PSTN 1.

Incidentally, while the audible signal notifying the telephone terminal 70*a* that a communication path is set through the IP network 2 and the PSTN 1 is transmitted (in the above step S70) in advance of transmitting a ring back tone (in the above step S75) in the case of the present embodiment, it is possible to transmit the audible signal and the MDCX command (in the above steps S69*a*) at another appropriate timing, for example, when conversation becomes possible between the telephone terminal 70*a* and the telephone terminal 71 (in the above step S76*b*).

Also, it is possible to transmit an IP packet corresponding to the audible signal (voice band signal) shown in FIG. 4 from the IP network 2 in place of the MDCX command (in the above steps S69*a*). In this case, the IP packet is transmitted to the telephone terminal 70*a* from the call agent 20 located on the IP network 2.

While the embodiment of the present invention has been explained as an example with use of MGCP, needless to say, the present invention can be embodied by the use of any other appropriate connection control protocol such as SIP (Session Initiation Protocol).

(Actions and Effects of Terminal Connection Device and Connection Control Device in Accordance with the Present Embodiment)

In accordance with the present embodiment, it is determined, on the basis of the destination telephone number contained in a connection request and the information stored in the storage unit 54, which of the IP network 2 and the PSTN 1 the VoIP gateway 50*a* (50*b*) sends the connection request to, and therefore it is avoided that the user of the telephone terminal 70a (70b) has to determine which of the IP network 2 and the PSTN 1 is used for communication.

Also, in accordance with the present embodiment, when the IP network state judgment unit 56 judges that a communication cannot be performed through the IP network 2, the connection processing unit 55 sends the connection request to the PSTN 1 even if the connection request is judged to be sent to the IP network 2, the user can perform communication without awareness of whether or not the IP network 2 is available.

Furthermore, in accordance with the present embodiment, when the destination telephone number is concatenated with predetermined identification information such as a succession of a particular number which is distinct from the telephone number itself, the connection request is always sent to the PSTN 1, and therefore the user of the telephone terminal 70a can arbitrarily and easily designates the PSTN 1 for communication.

Still further, in accordance with the present embodiment, the gateway 50a (50b) transmits to the telephone terminal, which is sending a connection request, the audible signal indicating which of the communication path routed only through the IP network 2 and the communication path routed through both the IP network 2 and the PSTN 1 is provided for the communication with the telephone terminal to which the destination telephone number is assigned. Accordingly, for example, in the case where the IP network 2 cannot be used for communication with the telephone terminal of the destination telephone number because of a failure and the like, or in the case where the telephone terminal of the destination telephone number is connected only to the PSTN 1, it is possible to notify the user that, on the basis of the connection request as sent, that the call agent 20 has provided a communication path routed through the IP network 2 and the PSTN 1 via the gateway 12.

(Overall Configuration of Communication System Including Multifunctional Telephone Terminals)

Figure 10:
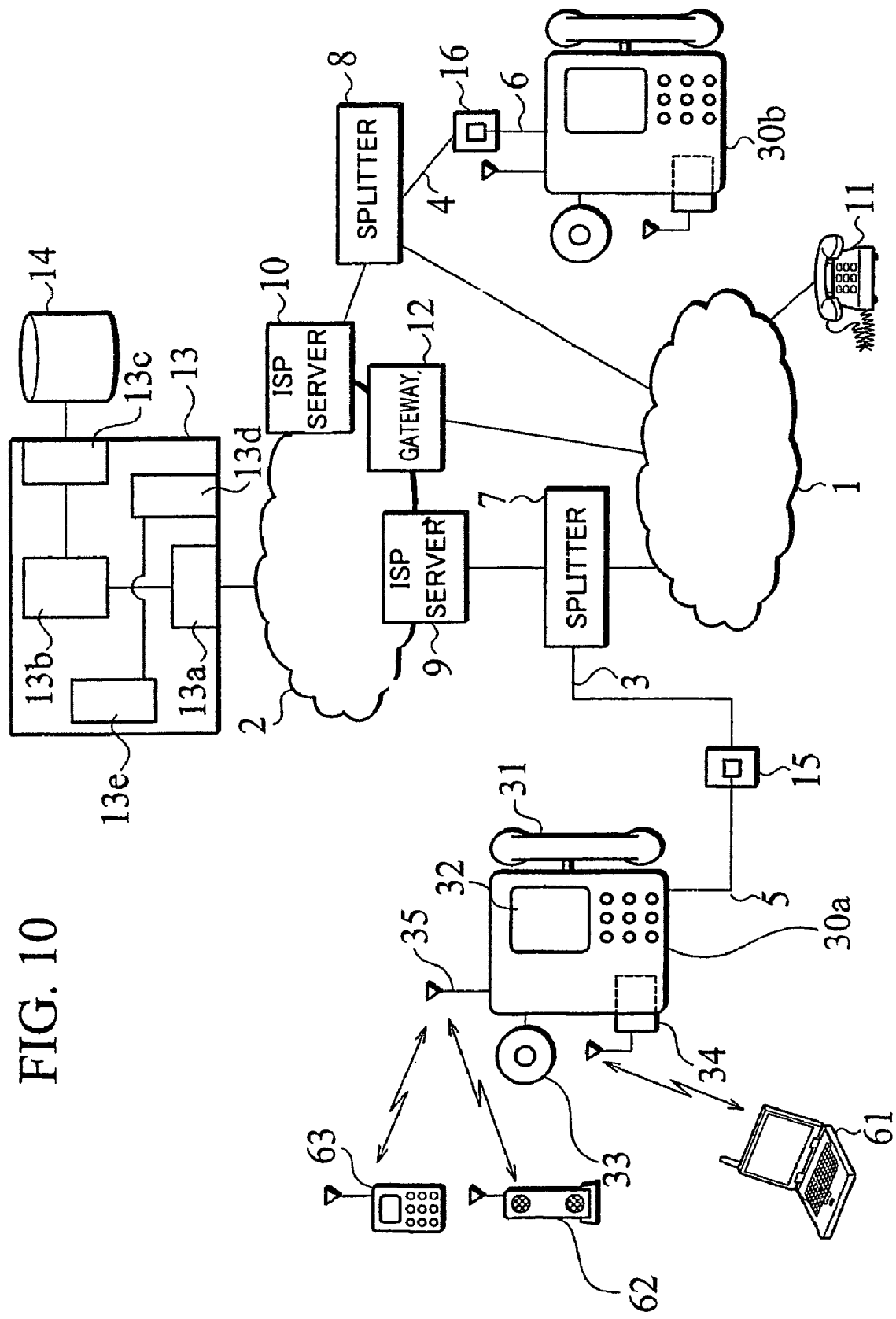
FIG. 10 is a schematic diagram showing the communication system including a multifunctional telephone terminal in accordance with a second embodiment of the present invention.
Figure 11:
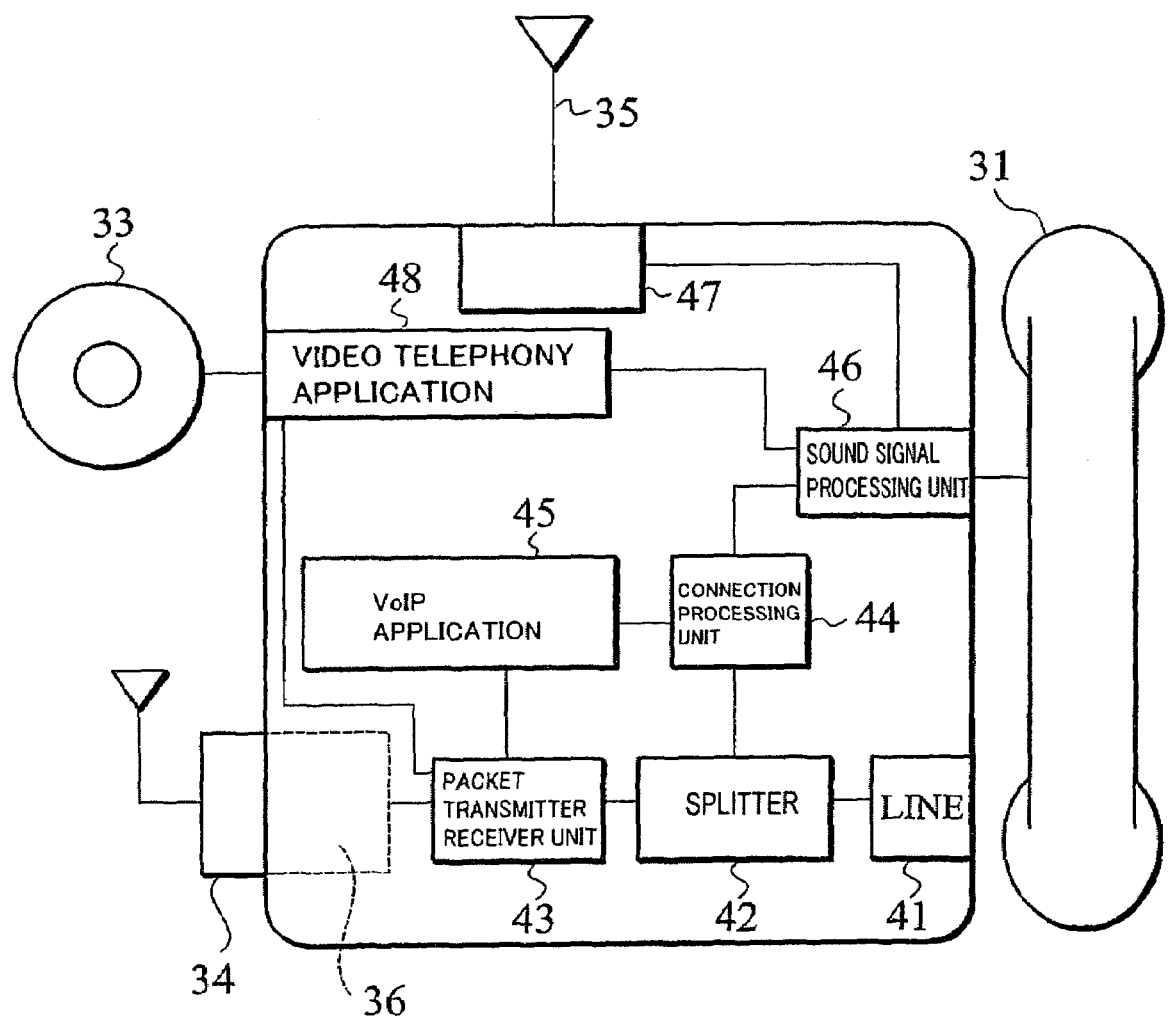
FIG. 11 is a functional block diagram showing the multifunctional telephone terminal in accordance with the second embodiment of the present invention.

Next, a multifunctional telephone terminal in accordance with an embodiment of the present invention will be explained with reference to the accompanying drawings. FIG. 10 is a view showing the schematic configuration of the communication system including multifunctional telephone terminals 30a and 30b in accordance with the present embodiment; and FIG. 11 is a functional block diagram showing the multifunctional telephone terminal 30a or 30b in accordance with the present embodiment.

As shown in FIG. 10, in the communication system including the multifunctional telephone terminals 30a and 30b in accordance with the present embodiment, there are ISP servers 9 and 10, a gateway 12 and a call control server 13, which are connected respectively to the IP network 2 such as the Internet.

The IP network 2 is a distributed computer network on which are interconnected the communication networks across the globe by the use of TCP/IP, and makes it possible to exchange packet data among various types of terminals through TCP/IP.

Also, the multifunctional telephone terminals 30a and 30b are connected to ISP (Internet service provider) servers and a PSTN (public switched telephone network) 1 respectively through ADSLs 3 and 4 and splitters 7 and 8. Alternatively, the multifunctional telephone terminals 30a and 30b can be connected to the ISP servers 9 and 10 and the PSTN 1 respectively by any appropriate high speed line such as a CATV line, an optical cable and the like in place of the ADSL via the splitters 7 and 8 through the ISP servers 9 and 10.

The ISP servers 9 and 10 are server units for providing access to the IP network 2 by connecting various types of terminals of users to the IP network 2 through the access lines 3 and 4 such as ADSLs in this case.

Also, the ISP servers 9 and 10 assign unique IDs, i.e., "IP addresses" to the multifunctional telephone terminals 30a and 30b when the respective multifunctional telephone terminals 30a and 30b are connected to the IP network 2.

The gateway 12 is a voice signal conversion unit through which the IP network 2 and the PSTN 1 are connected to each other by converting packet data which can be communicated through the IP network 2 into voice band signals which can be communicated through the PSTN 1 and vice versa.

The call control server 13 is connected to a management database 14 for storing a set of records which associate "IP addresses" as IDs assigned to the multifunctional telephone terminals 30a and 30b connected to the IP network 2 with "telephone numbers" as registered.

The call control server 13 notifies, in response to a query from the multifunctional telephone terminal 30a (or 30b), the "IP address" of the multifunctional telephone terminal 30b (or 30a) which is registered in the management database 14.

Incidentally, in the case of the present embodiment, the telephone numbers registered in the management database 14 are the telephone numbers for the IP telephone system prefixed with "* * * *" such as "* * * -1234-5678" for the purpose of distinguishing these numbers from telephone numbers of the public switched telephone service of the PSTN 1. In this configuration, the call control server 13 judges whether or not "* * * *" is prefixed to the telephone number as acquired from the multifunctional telephone terminal 30a which is the calling terminal in order to judge whether or not the user wants to carry on a voice conversation (IP telephone conversation) by the use of the IP network.

Also, as illustrated in FIG. 10, the call control server 13 is provided with a notification unit 13a, a conventional line selection unit 13b, a database searching unit 13c, an interface section 13d and a communication history management unit 13e.

The notification unit 13a is connected to the conventional line selection unit 13b, and notifies the multifunctional telephone terminal 30a as the calling terminal of the information about the gateway 12 which is selected by the conventional line selection unit 13b.

The conventional line selection unit 13b is connected to the notification unit 13a and the database searching unit 13c, and serves to select the gateway 12 with reference to the "telephone number" of the destination terminal as transmitted from the multifunctional telephone terminal 30a when receiving the notification that there is no "IP address" corresponding to the above "telephone number" in the management database 14.

The database searching unit 13c is connected to the management database 14 and the conventional line selection unit 13b, and searches the management database 14 for detecting the "IP address" corresponding to the "telephone number" of the destination terminal after acquiring the above "telephone number" through the interface section 13d from the multifunctional telephone terminal 30a which is registered in the management database 14. On the other hand, when there is no "IP address" corresponding to the above "telephone number", the database searching unit 13c notifies this fact to the conventional line selection unit 13b.

Also, the database searching unit 13c can authenticate whether or not the multifunctional telephone terminal 30a can use this communication system for voice conversation (IP telephone conversation). In this case, the database searching unit 13c performs the authentication by the use of the "IP address" and "MAC address" of the multifunctional telephone terminal 30a, or the "user ID" and "password" as transmitted from the multifunctional telephone terminal 30a.

The interface section 13d is connected to the database searching unit 13c and the communication history management unit 13e, and monitor the connection confirmation signal as transmitted from the multifunctional telephone terminal 30a. Incidentally, if there is no connection confirmation signal monitored within a predetermined time period, the interface section 13d removes the record containing the "IP address" of the multifunctional telephone terminal 30a, of which no connection confirmation signal is confirmed, from the management database 14 by the database searching unit 13c.

Also, the interface section 13d transmits to the database searching unit 13c the information required for authentication such as the "telephone number" of the destination terminal transmitted from the multifunctional telephone terminal 30a, or the "IP address", "MAC address", "user ID", "password" and the like transmitted from the multifunctional telephone terminal 30a.

The communication history management unit 13e is connected to the interface section 13d, calculates (counts) the number of the packets or the amount of the packet data as transmitted and received by the respective multifunctional telephone terminals 30a and 30b, and saves the result of the count (the number of the packets or the amount of the packet data) as a "communication history record". Alternatively, the communication history management unit 13e may acquire the number of the packets or the amount of the packet data from the multifunctional telephone terminals 30a and 30b.

Also, the communication history management unit 13e can calculate (count) the number of times that each of the multifunctional telephone terminals 30a and 30b accesses the call control server 13, and save the result of the count (the number of accesses) as a "communication history record". Alternatively, the communication history management unit 13e may acquire the number of accesses from the multifunctional telephone terminals 30a and 30b.

Also, the communication history management unit 13e can accumulate points on the basis of the result of the count (the number of the packets, the amount of the packet data, the number of accesses and the like) for each agent having sold the multifunctional telephone terminals 30a and 30b, with which the counting is performed during voice conversation. In this configuration, it is possible to incite the willingness of the agents to sell the multifunctional telephone terminals 30a and 30b.

The "telephone numbers" of the users who completed the registration process for receiving the service of the communication system are registered in the management database 14 while there are registered the "IP addresses" of the multifunctional telephone terminals 30a and 30b used by the respective users in association with the registered "telephone numbers".

Incidentally, in the case of the present embodiment, since the "IP addresses" may be changed, as needed, by the ISP servers 9 and 10, the "IP addresses" of the multifunctional telephone terminals 30a and 30b are continuously updated on the basis of the confirmation signal as transmitted from the multifunctional telephone terminals 30a and 30b.

Also, the management database 14 stores the information (the "IP address", "MAC address", "user ID", "password" and the like) for use in the authentication procedure of the multifunctional telephone terminals 30a and 30b which can use this communication system for voice conversation.

Furthermore, the management database 14 in accordance with the present embodiment stores a gateway table in which the long-distance code of each area is associated with the "IP address" of the gateway 12 located in that area.

The multifunctional telephone terminals 30a and 30b serve to transmit and receive voice band signals for voice conversation as packet data with the IP network 2 in order that the packet data is transmitted and received with the terminal of the "IP address" as acquired from the call control server 13 on the basis of the telephone number at the end of the line.

More specifically speaking, as illustrated in FIG. 10 and FIG. 11, the multifunctional telephone terminal 30a or 30b is provided with a handset 31, a display screen 32, a video camera 33, an antenna 35, a slot 36 into which a card 34 can be inserted, a telephone line connector (LINE) 41, a splitter 42, a packet transmitter receiver unit 43, a connection processing unit 44, a VoIP application 45, a sound signal processing unit 46, an antenna I/F 47 and a video telephony application 48.

The telephone line connector (LINE) 41 is used to receive a modular connector 15 or 16 connected to the telephone line 5 or 6. The multifunctional telephone terminals 30a and 30b can be used only by connecting the telephone line 5 or 6 to the communication line (LINE) 41, and therefore it is possible to dispense with cumbersome wiring work.

Also, the splitter 42 serves to merge voice band signals for voice conversation and packet data together onto ADSL, and divide the incoming signals merged on ADSL into voice band signals for voice conversation and packet data.

More specifically speaking, the splitter 42 divides the incoming signals from the telephone line connector (LINE) 41 into voice band signals for voice conversation and packet data, and transmits the voice band signals for voice conversation to the connection processing unit 44 and the packet data to the packet transmitter receiver unit 43. Conversely, the splitter 42 merges the voice band signals for voice conversation transmitted from the connection processing unit 44 and the packet data transmitted from the packet transmitter receiver unit 43, and transmits the combined signals through the telephone line connector (LINE) 41.

In the present embodiment, the packet transmitter receiver unit 43 serves as a packet transmitter receiver unit which transmits and receives, on the IP network 2 through the ADSL 3, the packet data converted from voice band signals by the VoIP application 45.

Also, the packet transmitter receiver unit 43 transmits and receives, on the IP network 2 through the ADSL 3, the packet data exchanged in the communication with a personal digital assistant 61 via the communication card 34 (such as a PCMCIA card) inserted into the slot 36.

Furthermore, the packet transmitter receiver unit 43 transmits and receives, on the IP network 2 through the ADSL 3, the packet data exchanged in the communication with the video signal processing unit (the video telephony application) 48.

Also, the packet transmitter receiver unit 43 is capable of calculating (counting) the number of the packets or the amount of the packet data as transmitted and received by the multifunctional telephone terminal 30a, and saving the result of the count (the number of the packets or the amount of the packet data) as a "communication history record". Furthermore, the packet transmitter receiver unit 43 is capable of transmitting the number of the packets or the amount of the packet data to the call control server 13 at a predetermined timing.

Still further, the packet transmitter receiver unit 43 is capable of calculating (counting) the number of times that the multifunctional telephone terminal 30a accesses the call control server 13, and saving the result of the count (the number of accesses) as a "communication history record". Still further, the packet transmitter receiver unit 43 is capable of transmitting the number of accesses to the call control server 13 at a predetermined timing.

In the present embodiment, the connection processing unit 44 serves as a connection processing unit which selects either the PSTN 1 or the IP network 2 for voice conversation.

More specifically speaking, when the destination telephone number which is dialed by the calling user is a telephone number for IP phone service, the connection processing unit 44 selects the IP network 2 for voice conversation, and connects the VoIP application 45 to the sound signal processing unit 46. Conversely, in the case where the destination telephone number which is dialed by the calling user is a telephone number for public switched telephone service, the connection processing unit 44 selects the PSTN 1 for voice conversation, and connects the splitter 42 to the sound signal processing unit 46.

Also, the connection processing unit 44 may be designed to select the PSTN 1 for voice conversation if the IP network 2 cannot be used for voice conversation. More specifically speaking, when it is judged that the IP network 2 cannot be used for voice conversation by the use of the VoIP application 45 for a various reason, the connection processing unit 44 selects the PSTN 1 for voice conversation.

In the present embodiment, when the IP network 2 is selected for voice conversation, the VoIP application 45 serves as a signal processing unit capable of performing the conversion between voice band signals and packet data which can be communicated through the IP network 2.

More specifically speaking, the VoIP application 45 converts voice band signals in the form of analog signals into digital data, converts the digital data into packet data for each predetermined cycle, and then adds a header and the like to each packet in accordance with a protocol such as TCP/IP.

Also, the VoIP application 45 restores voice band signals which are analog signals from the packet data received by the packet transmitter receiver unit 43, and transmits the voice band signals to the sound signal processing unit 46.

Furthermore, the VoIP application 45 transmits to the IP network 2 the destination telephone number which is dialed by the calling user through the ADSL 3 as digital data.

Still further, the VoIP application 45 acquires the IP address of the destination terminal from the call control server 13, and adds this IP address to the packet data converted from the voice band signals as a header.

The VoIP application 45 can store the telephone number and IP address which are assigned to the own terminal (the multifunctional telephone terminal 30a).

In this example, the VoIP application 45 supports a call control protocol such as H.323, SIP and MGCP/MEGACO (Media Gateway Control Protocol).

In the present embodiment, the sound signal processing unit 46 serves as a sound signal processing unit which performs the input/output processing of voice band signals for voice conversation. More specifically speaking, the sound signal processing unit 46 outputs voice band signals for voice conversation which are transmitted from the splitter 42, the VoIP application 45 or the video telephony application 48 through the speaker of the handset 31 provided for the multifunctional telephone terminal 30a. Also, the sound signal processing unit 46 transmits to the splitter 42, the VoIP application 45 or the video telephony application 48 voice band signals for voice conversation which are input through the microphone of the handset 31 provided for the multifunctional telephone terminal 30a.

Furthermore, the sound signal processing unit 46 is capable of outputting voice, warning tones, melody and the like in accordance with the message signal as acquired from the call control server 13 and the gateway 12.

Still further, the sound signal processing unit 46 is capable of performing the input/output processing of voice band signals with a PHS terminal 63 through the antenna I/F 47. More specifically speaking, the sound signal processing unit 46 transmits voice band signals for voice conversation as transmitted from the PHS terminal 63 to the splitter 42 or the VoIP application 45. Also, the sound signal processing unit 46 transmits voice band signals for voice conversation as transmitted from the splitter 42 and the VoIP application 45 to the PHS terminal 63 through the antenna I/F 47.

Furthermore, the sound signal processing unit 46 is capable of performing the input/output processing of voice band signals with a cordless handset 62 through the antenna I/F 47. More specifically speaking, the sound signal processing unit 46 transmits voice band signals for voice conversation as transmitted from the cordless handset 62 to the splitter 42 or the VoIP application 45. Also, the sound signal processing unit 46 transmits voice band signals for voice conversation as transmitted from the splitter 42 and the VoIP application 45 to the cordless handset 62 through the antenna I/F 47.

In the present embodiment, the antenna I/F 47 serves as a base station as a PHS base station which can communicate with the PHS terminal 63 through the antenna 35. Also, in the present embodiment, the antenna I/F 47 serves as a base unit as a cordless base phone which can communicate with the cordless handset 62 through the antenna 35. In this case, the antenna I/F functioning as the base station can be provided separately from the antenna I/F functioning as the base unit.

In the present embodiment, the video telephony application 48 serves as a video phone processing unit which performs the input/output processing of video signals for video telephony. Also, the video telephony application 48 performs the conversion process between video signals and packet data which can be communicated through the IP network 2.

More specifically speaking, the video telephony application 48 converts, into packet data, video signals comprising image signals as acquired by the video camera 33 provided for the multifunctional telephone terminal 30a and voice band signals as transmitted from the sound signal processing unit 46, and transmits the converted packet data to the packet transmitter receiver unit 43.

Also, the video telephony application 48 restores image signals and voice band signals from the packet data received by the packet transmitter receiver unit 43, displays the images as restored on the display screen 32, and transmits the voice band signal as restored to the sound signal processing unit 46.

The communication card 34 inserted into the slot 36 serves to perform the conversion of packet data as transmitted from the packet transmitter receiver unit 43 in accordance with a wireless LAN protocol such as IEEE 802.11, or a PHS protocol, and wirelessly transmit the data thus converted for wireless communication to the personal digital assistant 61. Also, the communication card 34 converts data as transmitted from the personal digital assistant 61 into packet data which can be communicated through the IP network 2, and transmits the data as converted to the packet transmitter receiver unit 43.

(Operation of Communication System as Described Above)

The operation of the above communication system will be explained with reference to FIG. 12 to FIG. 16.

Figure 12:
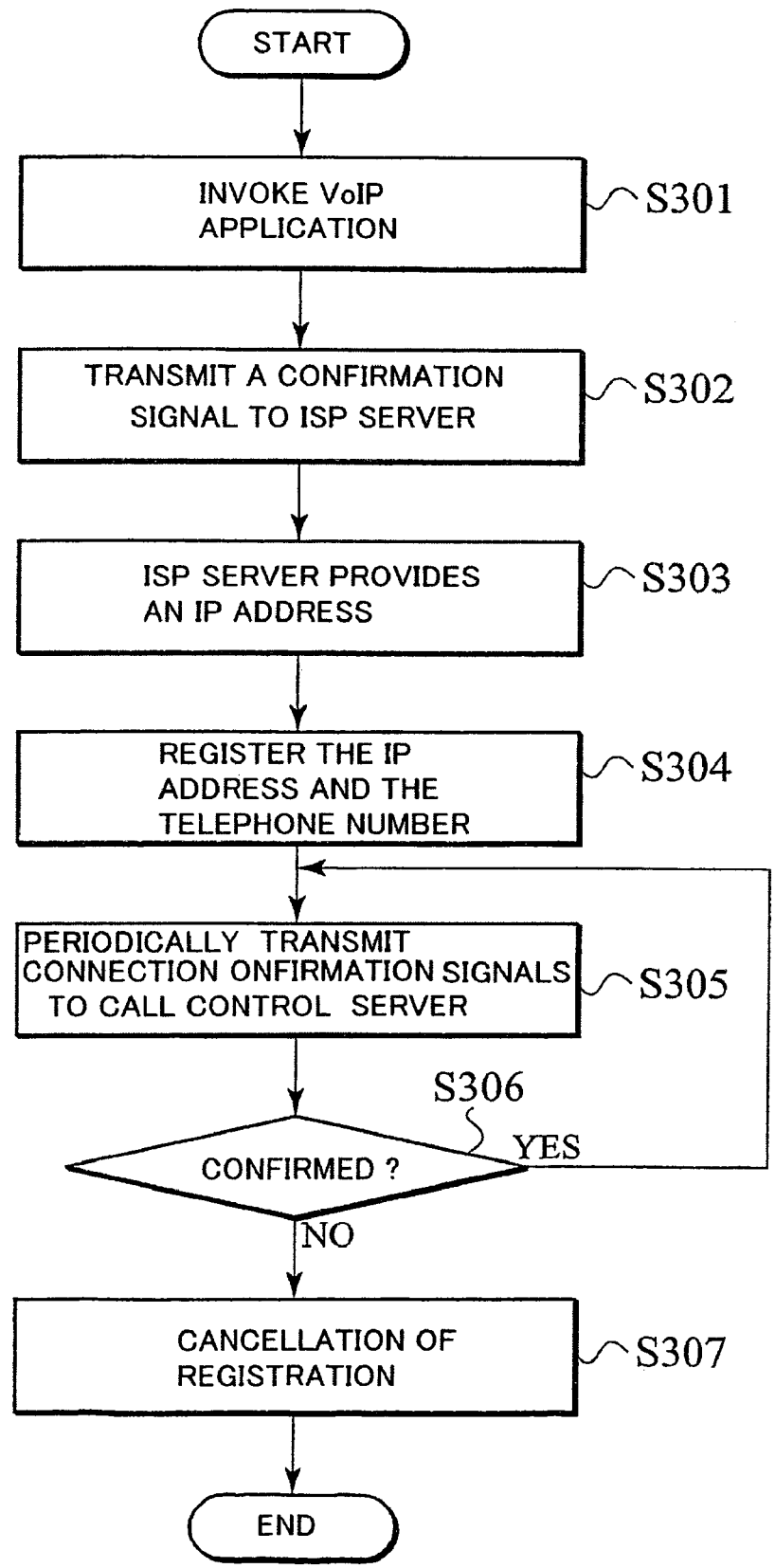
FIG. 12 is a view showing an operation flow of the multifunctional telephone terminal at startup in accordance with the second embodiment of the present invention.
Figure 13:
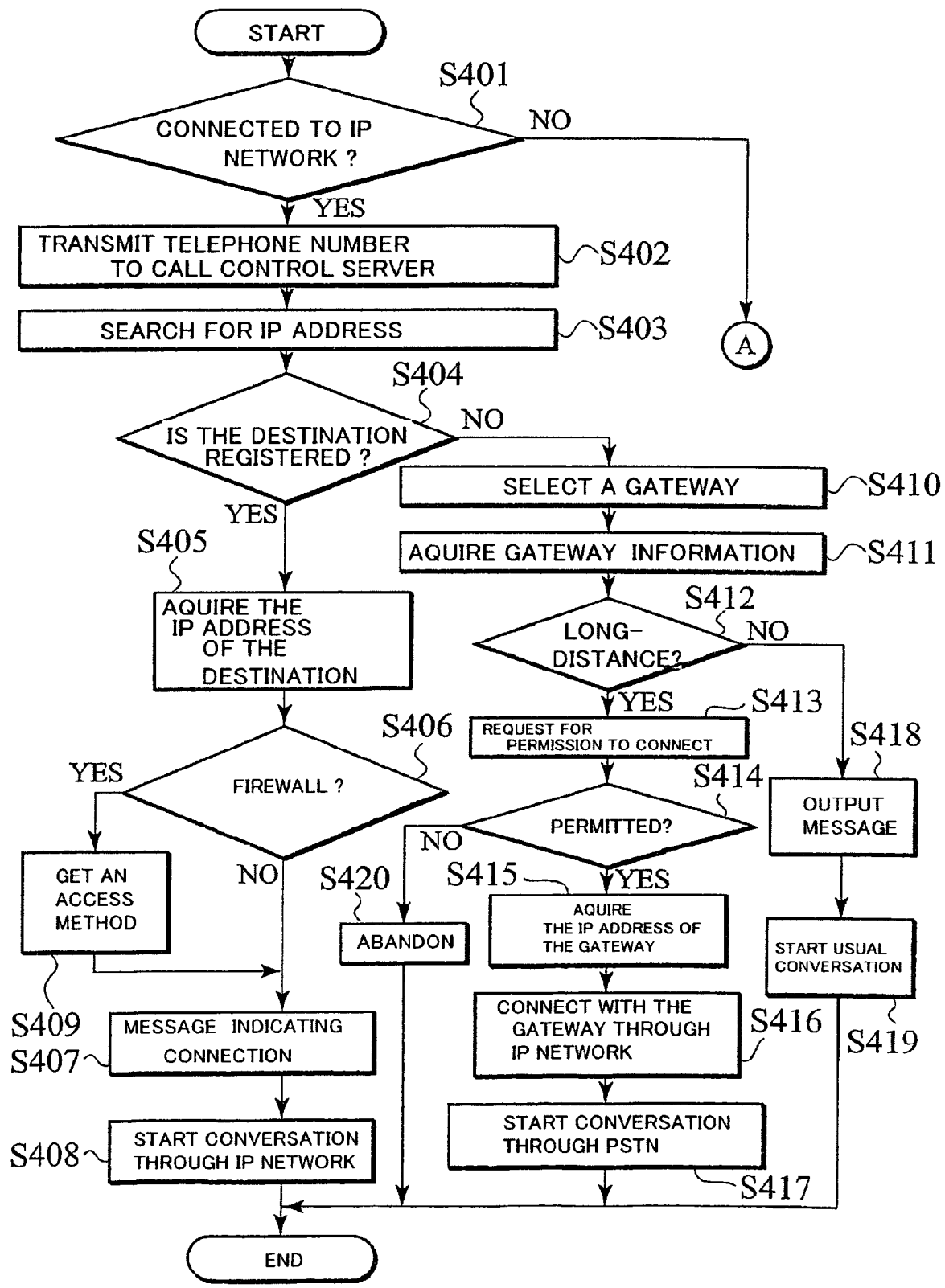
FIG. 13 is a flowchart showing a communication procedure with the multifunctional telephone terminal in accordance with the second embodiment of the present invention.
Figure 14:
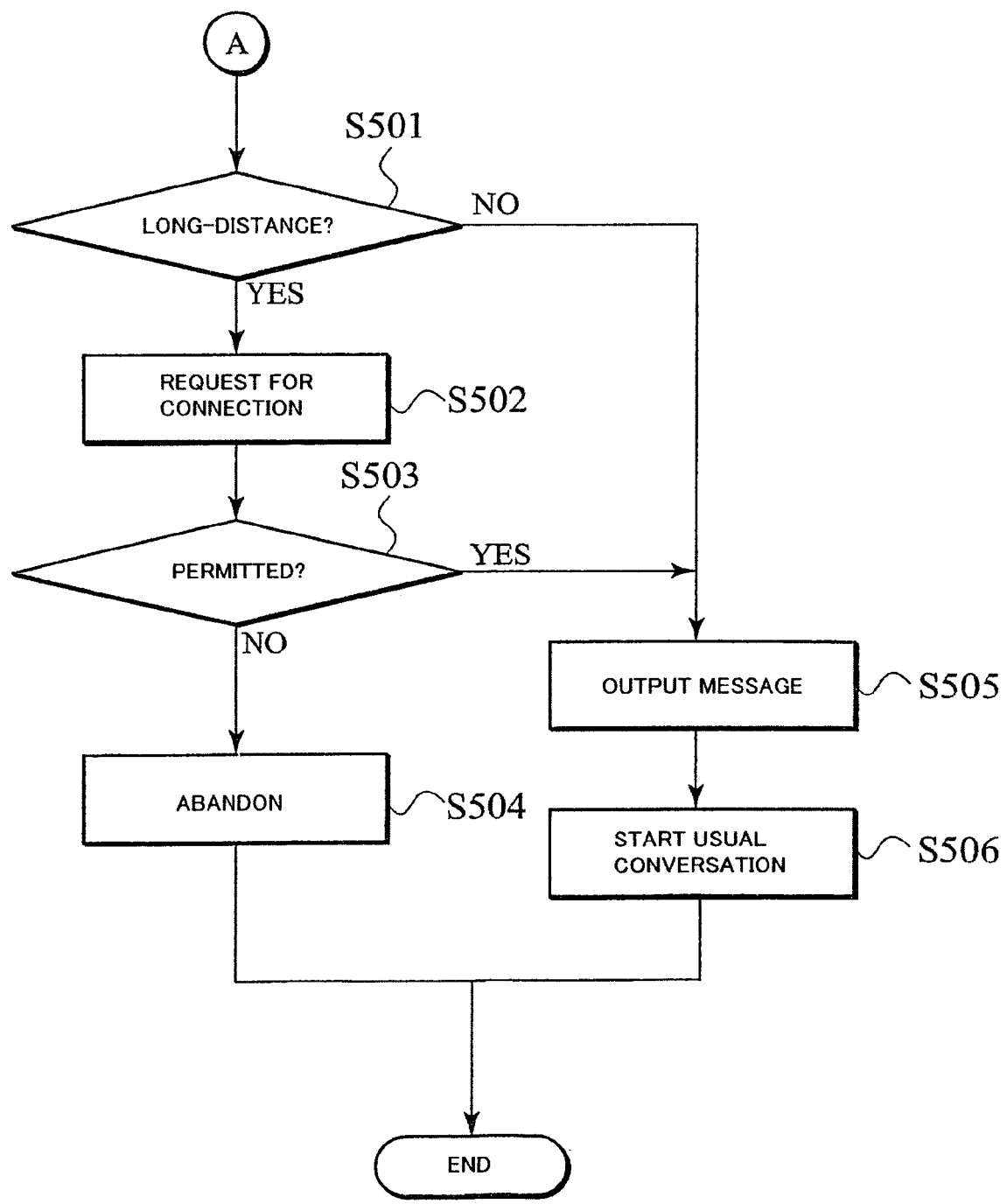
FIG. 14 is a flowchart showing the communication procedure with the multifunctional telephone terminal in accordance with the second embodiment of the present invention.

FIG. 12 is a flowchart showing the operation of the multifunctional telephone terminal 30a at startup in accordance with the present embodiment; and FIG. 13 and FIG. 14 are flowcharts showing the operation of the multifunctional telephone terminal 30a for voice conversation in accordance with the present embodiment.

Meanwhile, in this exemplary case, it is assumed that a phone call is made from the multifunctional telephone terminal 30a or telephone equipment 11 as the calling terminal to the multifunctional telephone terminal 30b as the destination terminal.

As shown in FIG. 12, when the user of the multifunctional telephone terminal 30a starts up the multifunctional telephone terminal 30a, for example, by turning on the multifunctional telephone terminal 30a (S301), the multifunctional telephone terminal 30a transmits a confirmation signal to the ISP server 9 (S302). This confirmation signal is transmitted to the IP address of the ISP server 9 stored in the VoIP application 45 of the multifunctional telephone terminal 30a as packet data.

After receiving this confirmation signal, the ISP server 9 provides an IP address for the multifunctional telephone terminal 30a, and transmits the IP address to the multifunctional telephone terminal 30a as packet data (S303). The multifunctional telephone terminal 30a stores the acquired IP address to the VoIP application 45.

Next, the multifunctional telephone terminal 30a as the calling terminal transmits to the call control server 13 the provided IP address and its own telephone number. The call control server 13 searches the management database 14 to confirm whether or not the telephone number as received is registered and, if registered, registers the IP address in association with the telephone number as received in the management database 14 (S304).

In this case, the call control server 13 authenticates whether or not the voice conversation service can be provided for the multifunctional telephone terminal 30a as the calling terminal with reference to "MAC address", "user ID", "password" and the like transmitted from the multifunctional telephone terminal 30a.

Also, in this case, since the multifunctional telephone terminal 30a as the calling terminal accesses the call control server 13 (the management database 14), the communication history record (the number of accesses) may be updated in the packet transmitter receiver unit 43.

Incidentally, it is assumed that the above steps S301 to S304 are performed also in the multifunctional telephone terminal 30b as the destination terminal, and that the telephone number and IP address of the multifunctional telephone terminal 30b as the destination terminal are registered in the management database 14.

Thereafter, the respective multifunctional telephone terminals 30a and 30b periodically transmit connection confirmation signals to the call control server 13 for the purpose of confirming that the connection with the IP network 2 is maintained (S305). This connection confirmation signal is periodically monitored by the call control server 13 (S306).

Namely, while the call control server 13 confirms whether or not the connection confirmation signals are periodically transmitted from the respective multifunctional telephone terminals 30a and 30b, if a connection confirmation signal is confirmed ("Y" in step S306), the call control server 13 waits for the next connection confirmation signal (S305).

On the other hand, if there is no connection confirmation signal monitored within a predetermined time period ("N" in step S306), the IP address is deleted from the management database 14 while judging that the corresponding multifunctional telephone terminal 30a or 30b is no longer connected to the IP network 2 (S307).

In this configuration, only the multifunctional telephone terminals 30a and/or 30b as currently connected to the IP network 2 are/is stored in the management database 14.

Next, with reference to FIG. 13, the operation of the multifunctional telephone terminal for voice conversation will be explained.

At first, the telephone number of the destination terminal is dialed on the multifunctional telephone terminal 30a. In the case where the service of this system is subscribed to with this telephone number, " * * * " is prefixed to the normal telephone number.

In response to the dialing operation, the VoIP application 45 judges whether or not a connection is established between the multifunctional telephone terminal 30a and the IP network 2 through the telephone line connector 5, the ADSL 3, the splitter 7 and the ISP server (S401).

In the case where a connection with the IP network 2 is established, the VoIP application 45 transmits to the call control server 13 the telephone number of the multifunctional telephone terminal 30b as the destination terminal as dialed by the calling user (S402).

The call control server 13 searches the management database 14 for the IP address of the multifunctional telephone terminal 30b as the destination terminal on the basis of the telephone number as received (S403), and judges whether or not the multifunctional telephone terminal 30b of the destination (the end of the communication line) is registered in the management database 14 (S404).

If the IP address of the multifunctional telephone terminal 30b as the destination terminal is detected in the management database 14, the IP address as detected is returned to the multifunctional telephone terminal 30a. By this process, the multifunctional telephone terminal 30a acquires the IP address of the multifunctional telephone terminal 30b as the destination terminal (S405).

Then, the multifunctional telephone terminal 30a judges whether or not the transmission and reception of data is possible on the basis of the IP address of the multifunctional telephone terminal 30b as the destination terminal. In other words, the multifunctional telephone terminal 30a confirms whether or not direct communication is viable through a fire wall and the like with the destination terminal (S406).

If the transmission and reception of data is possible, a connection is established. Contrary to this, if direct communication is not viable, an access method is acquired from the destination side (S409) to establish a connection.

After a connection is established, the multifunctional telephone terminal 30b as the destination terminal sends a message indicating that a connection is established, while the multifunctional telephone terminal 30a outputs a corresponding message from the speaker of the handset 31 in response to this message as received (S407). Next, voice conversation (IP telephone conversation) is started through the IP network 2 (S408).

When the IP address of the multifunctional telephone terminal 30b as the destination terminal is not detected in the step S404 so that it is judged that the multifunctional telephone terminal 30b as the destination terminal is not registered, the call control server 13 analyzes the telephone number as dialed by the calling user and selects the gateway 12 nearest to the multifunctional telephone terminal 30b as the destination terminal with reference to the long-distance code and so forth (S410). In this example, it is assumed that the gateway 12 as illustrated in FIG. 10 is selected. In this case, the information about the selected gateway 12 (for example, the long-distance code of the area where the gateway 12 is located) to the multifunctional telephone terminal 30a as the calling terminal.

After acquiring the information about the gateway 12 as transmitted (S411), the multifunctional telephone terminal 30a searches the telephone address table of the VoIP application 45 on the basis of the long-distance code of the gateway 12 and the like in order to judges whether or not the communication through the PSTN 1 is a long-distance phone call (S412).

For example, in the case where the communication is not a long-distance phone call, for example, in the case where the destination terminal is located in a neighboring area, a message indicative of this fact is output from the speaker of the handset 31 (S418), and then a connection is established with the multifunctional telephone terminal 30b as the destination terminal through the PSTN 1 to start a usual voice conversation (S419).

If the communication is judged to be a long-distance phone call in step S412, the multifunctional telephone terminal 30a prompts the user to select whether or not the connection is to be permitted (S413). If the user permits the connection ("YES" in step S414), the multifunctional telephone terminal 30a acquires the IP address of the gateway 12 from the call control server 13 (S415), connects with the gateway 12 through the IP network 2 (S416), and starts voice conversation with the multifunctional telephone terminal 30b as the destination terminal through the PSTN 1 via the gateway 12 (S417).

If the user does not permit the connection ("NO" in step S414), the connection procedure is abandoned (S420).

If the multifunctional telephone terminal 30a is judged not to be connected to the IP network 2 in step S401, the process is switched to the process of connecting the PSTN 1. In this case, as illustrated in FIG. 14, the multifunctional telephone terminal 30a judges whether or not the communication is a long-distance phone call with reference to the long-distance code of the telephone number as dialed and the like (S501) and, if the communication is not a long-distance phone call, a usual voice conversation is started (S506) after displaying a message indicating that the connection is made through the PSTN 1 rather than the IP network 2 (S505).

If the communication is judged to be a long-distance phone call in step S501, the multifunctional telephone terminal 30a asks the user to permit the connection (S502) and prompts the user to select (S503). If the user permits, a usual voice conversation is started (S506) after displaying a message indicating that the connection is made through the PSTN 1 as a long-distance phone call (S505).

If the user does not permit in step S503, connection is abandoned (S504).

Incidentally, while it is assumed that the destination terminal for voice conversation is the multifunctional telephone terminal 30b that can be connected to the IP network 2 in the case of the above example, the PSTN 1 is used for voice conversation in the conventional manner, for example, when the destination terminal is the telephone equipment 11 that is not registered in the call control server 13 so that the telephone number is dialed without a prefix of "* * *".

The multifunctional telephone terminal 30a as the calling terminal may update the communication history record (the number of accesses) in the packet transmitter receiver unit 43 in step S402, or update the communication history record (the number of accesses) in the packet transmitter receiver unit 43 in step S408, 417 or 419.

Next, with reference to FIG. 15 and FIG. 16, the data flow in the above procedure for voice conversation will be explained.

Figure 15:
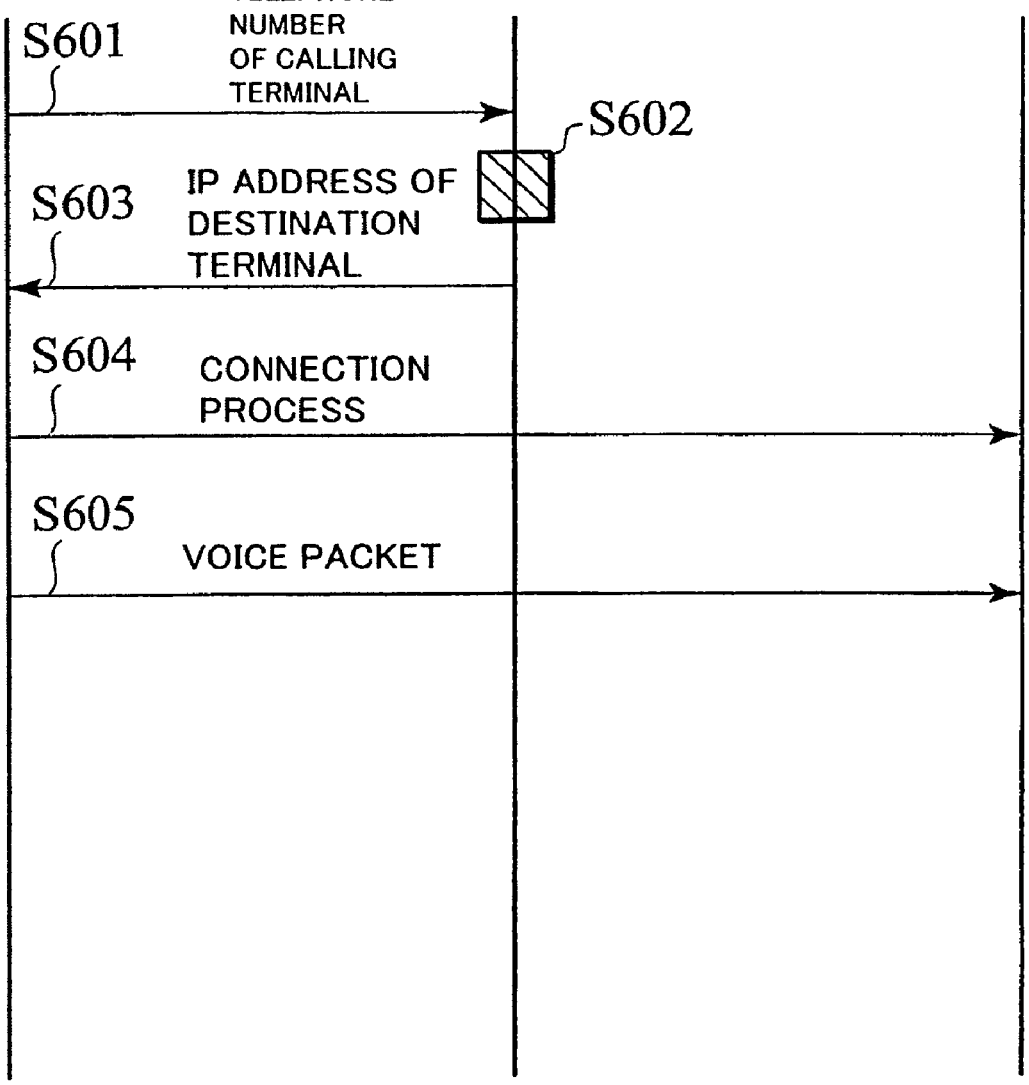
FIG. 15 is a sequence diagram showing the communication procedure with the multifunctional telephone terminal in accordance with the second embodiment of the present invention.

FIG. 15 is a sequence diagram showing the data flow in the case where the multifunctional telephone terminal 30a as the calling terminal and the multifunctional telephone terminal 30b as the destination terminal have been registered in the call control server 13.

As shown in the same figure, when the telephone number of the multifunctional telephone terminal 30b as the destination terminal is dialed by the calling user on the multifunctional telephone terminal 30a as the calling terminal, the VoIP application 45 of the multifunctional telephone terminal 30a as the calling terminal transmits to the call control server 13 the telephone number of the multifunctional telephone terminal 30b as the destination terminal through the ADSL 3, the splitter 7 and the ISP server 9 (S601).

The call control server 13 searches the management database 14 for detecting the IP address of the multifunctional telephone terminal 30b as the destination terminal on the basis of the telephone number of the multifunctional telephone terminal 30b as the destination terminal (S602).

The call control server 13 transmits to the multifunctional telephone terminal 30a as the calling terminal the IP address of the multifunctional telephone terminal 30b as the destination terminal (S603).

The VoIP application 45 of the multifunctional telephone terminal 30a as the calling terminal performs the process of connecting the multifunctional telephone terminal 30b as the destination terminal on the basis of the IP address of the multifunctional telephone terminal 30b (S604).

After completing the connection process, the VoIP application 45 of the multifunctional telephone terminal 30a as the calling terminal converts the voice band signal input through the handset 31 into packet data, and transmits the packet data together with the IP address of the multifunctional telephone terminal 30b added to the header and the like thereof (S605). In this case, the packet transmitter receiver unit 43 of the multifunctional telephone terminal 30a as the calling terminal updates a communication history record (the number of the packets or the amount of the packet data).

The multifunctional telephone terminal 30b as the destination terminal converts the packet data as received into voice band signals which are then output through the speaker of the handset to have a voice conversation.

Figure 16:
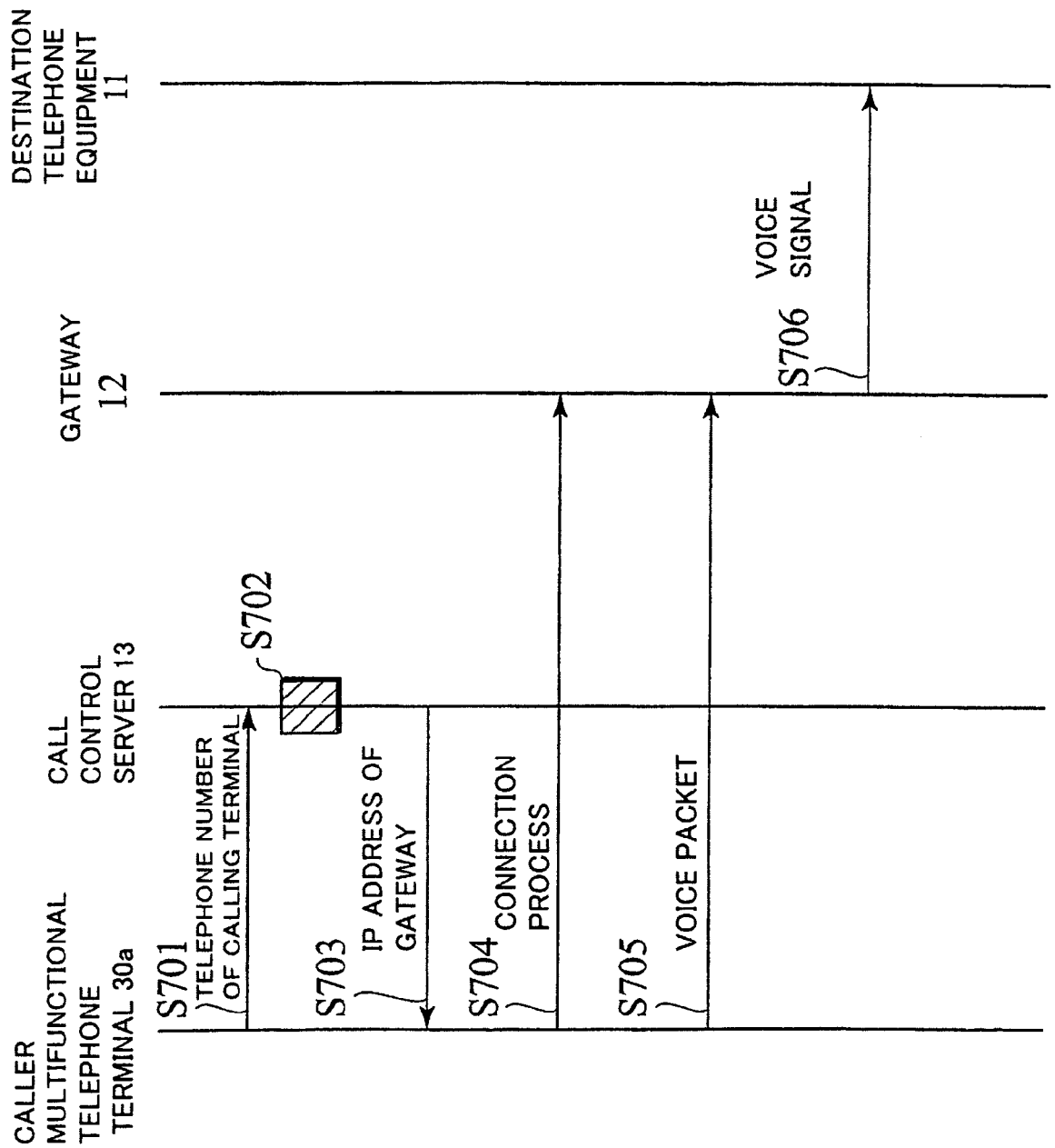
FIG. 16 is a sequence diagram showing the communication procedure for voice conversation with the multifunctional telephone terminal in accordance with the second embodiment of the present invention.

FIG. 16 is a sequence diagram showing the data flow in the case where the multifunctional telephone terminal 30a as the calling terminal has been registered in the call control server 13 while the telephone equipment 11 as the destination has not been registered in the call control server 13.

As shown in the same figure, when the telephone number of the telephone equipment 11 as the destination is dialed by the calling user on the multifunctional telephone terminal 30a as the calling terminal, the VoIP application 45 of the multifunctional telephone terminal 30a as the calling terminal transmits to the call control server 13 the telephone number of the telephone equipment 11 as the destination through the ADSL 3, the splitter 7 and the ISP server 9 (S701).

The call control server 13 searches the management database 14 on the basis of the telephone number of telephone equipment 11 as the destination. Since the destination terminal has been deleted from the management database 14 in the case where the telephone equipment 11 as the destination terminal is not registered in the call control server 13, the above IP address cannot be detected. Because of this, the call control server 13 analyzes the long-distance code of the telephone number as dialed, and searches for the gateway 12 nearest to the telephone equipment 11 as the destination terminal (S702).

The call control server 13 transmits the IP address of the gateway 12 to the multifunctional telephone terminal 30a as the calling terminal (S703).

The VoIP application 45 of the multifunctional telephone terminal 30a as the calling terminal performs the process of connecting the gateway 12 by the use of the IP address of the gateway 12 (S704).

After completing the connection process, the VoIP application 45 of the multifunctional telephone terminal 30a as the calling terminal converts the voice band signal input through the handset 31 into packet data, and transmits the packet data together with the IP address of the gateway 12 and the telephone number of the telephone equipment 11 as the destination which are added to the header and the like thereof (S705). In this case, the packet transmitter receiver unit 43 of the multifunctional telephone terminal 30a as the calling terminal updates a communication history record (the number of the packets or the amount of the packet data).

The gateway 12 converts the packet data into communication signals which can be transmitted and received through the PSTN 1, and transmits the communication signals to the telephone equipment 11 as the destination through the PSTN 1 (S706).

The telephone equipment 11 as the destination outputs the communication signals as received through the speaker of the handset as voice band signals to have a voice conversation.

(Actions and Effects of Multifunctional Telephone Terminal In Accordance with the Present Embodiment)

In accordance with the multifunctional telephone terminal of the present embodiment, the packet transmitter receiver unit 43 transmits and receives, on the IP network 2 through the ADSL 3, the packet data that is converted from voice band signals, and therefore an IP phone service enabling broadband communications can be used only by connecting the telephone line (subscriber line) 5 to the telephone line connector 41 of the multifunctional telephone terminal 30a so that it is possible to dispense with cumbersome connecting and wiring work.

Also, in accordance with the multifunctional telephone terminal of the present embodiment, even in the case where the telephone equipment 11 as the destination is not connected to the IP network 2, it is possible to connect to the telephone equipment 11 as the destination through the PSTN 1 and therefore to improve the reliability of the communication system.

Also, in accordance with the multifunctional telephone terminal of the present embodiment, the calling user can automatically select an IP phone service for the purpose of reducing the telecommunication cost.

Furthermore, in accordance with the multifunctional telephone terminal of the present embodiment, since the packet transmitter receiver unit 43 transmits and receives, on the IP network 2 through the ADSL 3, the packet data that is communicated with the personal digital assistant 61 through the communication card 34 inserted into the slot 36, a continuous connection Internet service can be provided for the personal digital assistant 61 without need for complicated connecting and wiring work.

INDUSTRIAL APPLICABILITY

As explained above, in accordance with the present invention, it is an object thereof to provide a terminal connection device, a connection control device and a multifunctional telephone terminal, wherein it is determined which of the packet network and the public switched telephone network is used for communication on the basis of the destination telephone number, and if the packet network cannot be used the communication is performed through the public switched telephone network while the user is informed of the communication path used for communication with the destination communication terminal.

What is claimed is:

1. A terminal connection device that is connectable to a packet network for transmitting and receiving packet data, a public switched telephone network for transmitting and receiving voice band signals, and a communication terminal for sending a connection request which contains a telephone number of a destination, said terminal connection device comprising:

a connection processing unit configured to send said connection request to one of said packet network and said public switched telephone network on the basis of the telephone number of said destination contained in the connection request;

a packet network state judgment unit configured to judge whether or not a communication is viable through said packet network; and a storage unit configured to store information about telephone numbers of destinations to which communication is only established through the public switched telephone network as a PSTN route-around table, wherein said connection processing unit is configured to compare the telephone numbers as in the connection request with the PSTN route-around table stored in the storage unit before a judgment by said packet network state judgment unit, if the telephone number matches one of the telephone numbers in the PSTN route-around table, the connection processing unit sends the connection request to said public switched telephone network, if the telephone number does not match any of telephone numbers as listed in said PSTN route-around table and said packet network state judgment unit judges that a communication is not viable through said packet network, said connection processing unit sends said connection request to said public switched telephone network even if it is decided to send said connection request to said packet network, and if the telephone number does not match any of telephone numbers as listed in the PSTN route-around table and said packet network state judgment unit judges that a communication is viable through said packet network, said connection processing unit sends said connection request to said packet network.

2. The terminal connection device as claimed in claim 1 wherein, if predetermined identification information is added to the telephone number of said destination contained in said connection request, said connection request is sent to said public switched telephone network irrespective of whether or not the telephone number matches one of the patterns of telephone numbers as listed in said PSTN route-around table.

3. The terminal connection device as claimed in claim 1 further comprising a path information processing unit that receives, from said packet network, predetermined packet data indicating which of a first communication path routed only through said packet network and a second communication path routed through both said packet network and said public switched telephone network is provided for the communication with a communication terminal, to which the telephone number of said destination is assigned, on the basis of said connection request sent to said packet network by said connection processing unit, and transmits to said communication terminal which has sent said connection request a notification signal indicating that which of said first communication path and said second communication path is provided on the basis of said predetermined packet data as received.

4. A multifunctional telephone terminal configured to be connected to said terminal connection device as claimed in claim 1, comprising:
- a sound signal processing unit configured to perform an input/output processing of voice band signals for voice conversation;
- a connection processing unit configured to select which of a public switched telephone network and a packet network is used for said voice conversation therethrough;
- a sound signal conversion unit configured to perform the conversion process between said voice band signals and packet data which can be communicated through said packet network when the packet network is selected for said voice conversation;
- a packet transmitter receiver unit configured to transmit and receive, with said packet network, said packet data converted from said voice band signals through an asymmetric digital subscriber line.

5. The multifunctional telephone terminal as claimed in claim 4 wherein, when said packet network cannot be used for said voice conversation, said connection processing unit selects the public switched telephone network for said voice conversation therethrough.

6. The multifunctional telephone terminal as claimed in claim 4 further comprising a base station unit as a PHS base station which can communicate with a PHS terminal, wherein said sound signal processing unit performs the input/output processing of said voice band signal with said PHS terminal through said base station.

7. The multifunctional telephone terminal as claimed in claim 4 further comprising a base unit as a cordless base phone which can communicate with a cordless handset, wherein said sound signal processing unit performs the input/output processing of said voice band signal with said cordless handset through said base unit.

8. The multifunctional telephone terminal as claimed in claim 4 further comprising a slot into which a communication card can be inserted to enable communication with a personal digital assistant, wherein said packet transmitter receiver unit transmits and receives, with said packet network via said asymmetric digital subscriber line, said packet data which is communicated with said personal digital assistant through said communication card inserted into said slot.

9. The multifunctional telephone terminal as claimed in claim 4 further comprising a video phone processing unit which performs the input/output processing of video signals for video telephony, wherein said video phone processing unit performs the conversion process between said video signals and packet data which can be communicated through said packet network, and wherein said packet transmitter receiver unit transmits and receives, with said packet network via said asymmetric digital subscriber line, said packet data which is communicated with said video phone processing unit.

* * * * *